(12) United States Patent
Helmer

(10) Patent No.: US 9,895,798 B2
(45) Date of Patent: Feb. 20, 2018

(54) DEVICE FOR MOVEMENT BETWEEN AN INPUT MEMBER AND AN OUTPUT MEMBER

(75) Inventor: Patrick Helmer, Bernex (CH)

(73) Assignee: Force Dimension (CH)

( * ) Notice: Subject to any disclaimer, the term of this patent is extended or adjusted under 35 U.S.C. 154(b) by 1082 days.

(21) Appl. No.: 12/738,015

(22) PCT Filed: Oct. 22, 2007

(86) PCT No.: PCT/EP2007/009143
§ 371 (c)(1),
(2), (4) Date: Aug. 17, 2010

(87) PCT Pub. No.: WO2009/049654
PCT Pub. Date: Apr. 23, 2009

(65) Prior Publication Data
US 2010/0300230 A1 Dec. 2, 2010

(30) Foreign Application Priority Data
Oct. 19, 2007 (EP) .................................. 07020499

(51) Int. Cl.
*B25J 9/00* (2006.01)
*B25J 9/10* (2006.01)
*B25J 17/02* (2006.01)

(52) U.S. Cl.
CPC ............. *B25J 9/106* (2013.01); *B25J 9/0072* (2013.01); *B25J 9/1065* (2013.01); *B25J 17/0266* (2013.01); *Y10T 74/20* (2015.01)

(58) Field of Classification Search
CPC ............... B25J 17/0266; B25J 17/0283; B25J 17/0275; B25J 18/00; B25J 18/04; B25J 18/06; B25J 9/1065; B25J 9/104; B25J 9/00; B25J 9/0072; B25J 3/00; B25J 9/1615
USPC ................ 74/490.01–490.05; 901/14–18; 414/733–737
See application file for complete search history.

(56) References Cited

U.S. PATENT DOCUMENTS 5,257,998 A * 11/1993 Ota et al. ........................ 606/130
5,273,039 A * 12/1993 Fujiwara et al. ............. 600/407
5,279,309 A    1/1994 Taylor et al.
(Continued)

OTHER PUBLICATIONS

International Search Report dated Dec. 8, 2008 for Application PCT/EP2007/009143.

*Primary Examiner* — William Kelleher
*Assistant Examiner* — Bobby Rushing, Jr.
(74) *Attorney, Agent, or Firm* — Frost Brown Todd LLC

(57) ABSTRACT

A device for the relative movement between an input member and an output member, the device comprising an input member (100); an output member (108); an intermediate member (104) coupling the input member (100) and the output member (108); a first kinematics bond (102) coupling the intermediate member (104) and the input member (100); the first kinematics bond (102) providing at least two rotational degrees of freedom; and a second kinematics bond (106) coupling the intermediate member (104) and the output member (108), the second kinematics bond (106) being adapted to transmit rotational motions between the intermediate member (104) and the output member (108) and to offset rotation axes of at least two rotational degrees of freedom of the output member (108).

25 Claims, 27 Drawing Sheets

(56) References Cited

U.S. PATENT DOCUMENTS

| | | | | |
|---|---|---|---|---|
| 5,656,905 | A * | 8/1997 | Tsai | 318/568.21 |
| 5,676,157 | A * | 10/1997 | Kramer | 600/595 |
| 5,817,084 | A * | 10/1998 | Jensen | 606/1 |
| 6,047,610 | A * | 4/2000 | Stocco et al. | 74/479.01 |
| 6,516,681 | B1 * | 2/2003 | Pierrot et al. | 74/490.01 |
| 6,702,805 | B1 * | 3/2004 | Stuart | 606/1 |
| 6,714,839 | B2 * | 3/2004 | Salisbury et al. | 700/245 |
| 6,723,106 | B1 * | 4/2004 | Charles et al. | 606/130 |
| 6,729,202 | B2 * | 5/2004 | Gosselin et al. | 74/490.05 |
| 6,786,896 | B1 * | 9/2004 | Madhani et al. | 606/1 |
| 6,997,669 | B2 * | 2/2006 | Kong et al. | 414/735 |
| 7,107,090 | B2 * | 9/2006 | Salisbury et al. | 600/427 |
| 7,148,646 | B2 * | 12/2006 | Matsushita | 318/568.21 |
| 7,763,015 | B2 * | 7/2010 | Cooper | A61B 19/20 606/1 |
| 9,345,544 | B2 * | 5/2016 | Hourtash | B25J 9/1607 |
| 2003/0021107 | A1 * | 1/2003 | Howell | E04B 9/006 362/147 |
| 2004/0013509 | A1 * | 1/2004 | Roy et al. | 414/735 |
| 2006/0196299 | A1 * | 9/2006 | Taboada et al. | 74/490.01 |
| 2010/0300230 | A1 * | 12/2010 | Helmer | 74/469 |

\* cited by examiner

| Symbol | Description |
|---|---|
| TCP • | Tool Center Point (TCP) or local output |
| ▬ | Ground or local input |
| ▬ | constraint on translational DOF (force) |
| ⊃ | constraint on rotational DOF (torque) |
| ⇔ | actuated (active) translational DOF (force) |
| ⊋ | actuated (active) rotational DOF (torque) |

Fig. 1

| Symbol | Description |
|---|---|
| ⊣▭⊢ | joint providing one translational DOF (prismatic joint) |
| ⊣◯⊢ | joint providing one rotational DOF (pivot joint) |
| ─◯─ | joint providing three rotational DOF (spherical or ball joint) |
| ─⊗─ | joint providing two rotational DOF (universal or cardan joint) |

Fig. 2

DEVICE FOR MOVEMENT BETWEEN AN INPUT MEMBER AND AN OUTPUT MEMBER

FIELD OF THE INVENTION

The present invention generally relates to devices providing relative movements between an input member and an output member.

BACKGROUND OF INVENTION

Manipulators, robots, haptic devices or more generally devices for relative movement of two elements with full motion capability in space need to provide six Degrees Of Freedom (DOF) at their moveable output member or end effector (usually with respect to the ground or base), which corresponds to the maximum spatiality of a rigid body in space. Three DOF are needed to perform translations in space and three DOF for rotations.

For most applications, only a subset of these six DOF is needed. So, the complexity and cost of the robotic structure can be reduced. Further, performance may be increased by choosing a design with fewer than six active (or powered) DOF, the motions along the remaining non-powered DOF being rigidly constrained (e.g. to ground or a fixed structure), or left free to move (or compliant) in some very special designs (e.g. path generation or compliant mechanisms).

In so-called redundant designs, there are more than six DOF (or mobility) in the mechanical structure, which can be useful to control the posture in space (or how the limbs occupy space). This allows, for example, to accommodate special space requirements or to avoid obstacles. As an example, a snake-like robot with a large amount of articulated segments (more than six) providing each one DOF can choose from different possible paths to reach a given target, even though it's head or end effector can only provide six DOF. Position and orientation of a single rigid body like the end effector is also called pose, whereas posture refers to all the limbs including the end effector. Some devices incorporate additional DOF for specific features, as for example a pincher, gripper, scissor, or even articulated finger-like structures to provide advanced grasping capabilities.

As common actuators (and sensors) provide motion along only a single DOF joint, either an active translational DOF (or prismatic joint) along an axis or an active rotational DOF (or pivot joint) around an axis, a kinematics structure (or an arrangement of links and active and passive joints or more generally speaking an arrangement of kinematics bonds) is required to obtain the desired multiple DOF motion of the end effector. Many different kinematics structures with up to six DOF are known. They can be divided in three main groups: serial, parallel and hybrid kinematics structures.

"Serial" kinematics structures (also called open-loop structures) are built of a single chain of rigid links interconnected by actuated joints. This serial arrangement of links and active joints offers large motion ranges, but inertia (or mass) is high (since actuators are carried by the structure) and stiffness and strength are low (since the complete forces and torques are transmitted through every link and joint of the kinematics chain, adding their compliances and weights). The resulting mechanical eigen-frequencies (related to the ratio between stiffness and inertia) and motion dynamics are low; undesired bending and vibrations lead to low precision.

"Parallel" kinematics have more than one kinematics chain connecting the base to the end effector, each chain having one actuated joint, the others being passive joints, thus enabling to reduce inertia and weight (since heavy parts of actuators are located close to or directly on the ground, which has also a positive influence in reducing complexity and wear of power and signal connections from the ground to these actuators) and to increase stiffness and strength (since multiple chains act "in parallel" on the end effector, each chain transmitting only part of the total forces and torques applied on the end effector). The resulting mechanical eigen-frequencies and motion dynamics are therefore higher than for serial kinematics structures. Drawbacks are reduced motion ranges (since the resulting workspace is defined by the intersection of several chains, which can furthermore interfere with each other and let undesired singular or unstable postures arise within the workspace), reduced accessibility to the end effector, greater volume occupied by moving mechanical parts and greater complexity due to the additional passive joints.

A third kind of kinematics structures called "hybrid" can offer a way in between pure serial and pure parallel structures to at least partially reduce some of their respective drawbacks. Hybrid structures can for example offer higher motion ranges than fully parallel designs, while being stiffer and having less inertia and weight than serial kinematics designs. Some of them have multiple chains arranged in parallel using more than one actuated joint per chain (or complex limbs), while others stack several parallel kinematics structures in series.

In many applications, the end effector of a robotic structure carries an object or a tool that has to be positioned and oriented in space. A general rotational movement requires the definition of a rotation center (RC) (or a rotation axis in case of a one DOF rotational motion), usually related to the carried object or tool and located at a given point of interest, as for example its center or tip. In order to avoid interference issues with moving mechanical parts and to allow for sufficient accessibility to the carried object or tool, the carried object or tool and its associated rotation center are generally located at a distance (remote) from the end effector fixture in the outer side of the volume occupied by these moving mechanical parts. The choice of the RC location with respect to the kinematics structure needs to take into account practical requirements of geometrical nature and will greatly influence the usable range of motion for a given kinematics structure. To be more precise, the dexterous workspace is the one being greatly influenced by the choice of the tool center point (TCP), which geometrically defines and is coincident with the RC on the end effector. The dexterous workspace is defined by the set of all positions that can be reached in translation by the end effector's TCP while ensuring a minimal given rotational motion range around the TCP.

Any given kinematics structure has inherent or natural TCP locations where its dexterous workspace is optimal. Choosing a remote TCP located at a distance (or offset) with respect to an inherently optimal TCP will define a remote RC (RRC) or remote center of motion (RCM), which will inevitably reduce the dexterous workspace in this remote TCP.

A rotational movement around such a RRC will generate translational movements of the end effector on a spherical surface (or circular path in case of a one DOF rotational motion) to compensate for the distance between inherent RC and RRC. These compensating translational movements are subtracted from the initially available translational motion range, the remaining usable translational motion range being thereby reduced. This dexterous workspace reduction is generally associated with an increase of the apparent inertia at the remote TCP and a reduction of the maximum rotational velocity.

In order to reduce or even to annihilate the amplitude of these compensating translational movements, kinematics structures should be spatially configured for a given application or specifically designed in such a way that their natural RC is inherently located close to or even at the exact desired remote TCP, thereby reducing only little or even none of the translational motion ranges and dexterous workspace. Known parallel and hybrid kinematics structures usually have their natural RC located somewhere in the inner side of the volume occupied by its moving mechanical parts with little or no accessibility to it, and have inherently low angular motion ranges due to mechanical interference issues and generally have undesired singular postures within the workspace. For these structures, choosing a remote TCP location on the outer side of the volume occupied by its moving mechanical parts substantially reduces further its initially limited dexterous workspace.

To partly overcome these limitations, some parallel and hybrid kinematics designs incorporate special one DOF pivot joints or joint arrangements with inherent RRC. For kinematics structures limited to motions including only one rotational DOF, such an existing RRC pivot joint is suitable and many different examples can be found.

If a two or three DOF RRC joint is needed, it is always possible to use a serial kinematics arrangement of two or three discrete one DOF pivot joints respectively, some or all of which can be of RRC type. However, this arrangement does not completely solve the interference and accessibility issues stated above, especially in designs where several kinematics chains are arranged in parallel.

In general, providing for relative movements between two members or elements, known devices based on parallel and hybrid kinematics structures inherently have low rotational motion ranges and dexterous workspace (due to mechanical interferences between relatively moving parts and to presence of undesired singular postures) and do not provide sufficient accessibility to their inherent optimal RRC.

OBJECT OF INVENTION

The object of the present invention is to provide a solution, particularly in form of a device for relative movement of two members, which overcomes the above discussed problems at least in part.

SHORT DESCRIPTION OF THE INVENTION

In order to improve devices based on parallel and hybrid kinematics structures on these aspects, a novel mechanism is disclosed for relative movement of an output member with respect to an input member providing at least two DOF of rotational type around remote rotation axes (i.e. remotely located at a given offset distance with respect to output member). Incorporating the present invention leads to structures with the advantage of allowing, for example, excellent accessibility around its remote rotation axes, large angular motion ranges, high stiffness (e.g. in designs with three bars since no bending and no torsion stresses occur in these bars, only tensile and compressive forces), low inertia and direct access to drive the at least two rotational DOF. Under specific geometrical conditions, the at least two remote rotation axes are intersecting in a common RRC and furthermore the remote rotation axes do not shift during rotational motion.

It is noted that incorporating the present invention in existing kinematics structures by substitution is the key to a whole new family of parallel and hybrid structures with improved performance (embodiments of such arrangements are, for example, defined in the claims).

The present invention provides a device for the relative movement between an input member and an output member, the device comprising an input member; an output member; an intermediate member coupling the input member and the output member; a first kinematics bond coupling the intermediate member and the input member; the first kinematics bond providing at least two rotational degrees of freedom; and a second kinematics bond coupling the intermediate member and the output member, the second kinematics bond being adapted to transmit rotational motions from the intermediate member to the output member and to offset rotation axes of at least two rotational degrees of freedom of the intermediate member to a remote location on the output member; wherein the second kinematics bond comprises means being adapted to provide motion on a curved surface; and means being adapted to constrain at least two rotational degrees of freedom.

Further embodiments are defined in further claims.

SHORT DESCRIPTION OF THE DRAWINGS

Embodiments of the invention will now be described by way of example and with reference to the accompanying drawings, in which:

FIGS. 1 and 2: show descriptions of symbols used in the drawing;

FIG. 3: illustrates a known serial kinematics arrangement (robot arm);

FIG. 4: illustrates the robot arm of FIG. 3 in another posture after clockwise rotation of output member around its TCP;

FIG. 5: illustrates the robot arm of FIG. 3 with very large rotational motion range in the special case where the TCP is chosen in the center of wrist joint;

FIG. 6: illustrates a robot arm kinematically equivalent to the one of FIG. 5, but having a different wrist joint with RRC capability;

FIG. 7: illustrates the robot arm of FIG. 6 in another posture after clockwise rotation around its TCP;

FIG. 8: illustrates an example of a known RRC pivot joint (pantograph linkage);

FIG. 9: illustrates a known arrangement (spatial robot arm) with 6 DOF and TCP chosen at a location remote from the wrist joint;

FIG. 10: illustrates functional elements of the present invention;

FIG. 11: illustrates an embodiment of the present invention incorporated in a robotics structure;

FIG. 12: illustrates a known serial kinematics arrangement including a rigid link terminated by a joint with two rotational DOF on each one of its ends;

FIG. 13: illustrates an alternate kinematics arrangement, kinematically equivalent to the one of FIG. 12, but having a different wrist joint with two DOF RRC capability;

FIG. 14: illustrates an embodiment of the present invention, kinematically quasi-equivalent to the one of FIG. 13, showing first and second joint arrangements as well as geometric relationship leading to minimal compensating translational movements;

FIG. 15: illustrates the embodiment of FIG. 14 in a different posture after a clockwise rotation around the X axis in the first kinematics bond;

FIG. 16: illustrates the embodiment of FIG. 15 in a different posture after a subsequent translation on a circular path generated in the second kinematics bond;

FIG. 17: illustrates the embodiment of FIG. 14 in a different posture after a combined movement in the first and second kinematics bonds around their respective X axes;

FIG. 18: illustrates the embodiment of FIG. 14 in a different posture after a combined movement in the first and second kinematics bonds around their respective Z axes;

FIG. 19: illustrates the embodiment FIG. 14 in a different posture after a translation of TCP along a circular path due to movement in the second kinematics bond;

FIG. 20: illustrates the embodiment of FIG. 19 in a different posture after a subsequent rotation of the TCP around its translational shifted position;

FIGS. 21 to 26: illustrate further embodiments of the present invention;

FIG. 27: illustrates a cardan or universal joint;

FIG. 28: illustrates a known arrangement having two rotational DOF;

FIG. 29: illustrates an embodiment of the present invention including additional means to constrain two translational DOF;

FIG. 30: illustrates an embodiment of the present invention including additional means to constrain two translational DOF;

FIG. 31: illustrates a spherical joint;

FIG. 32: illustrates a known arrangement having three rotational DOF:

FIG. 33: illustrates an arrangement alternative to the arrangement of FIG. 32;

FIG. 34: illustrates a known arrangement of a rigid link terminated by a joint with two rotational DOF on one of its ends and with three rotational DOF on its other end;

FIG. 35: illustrates an alternate arrangement of structure in FIG. 34;

FIG. 36: illustrates an embodiment alternative of the present invention;

FIG. 37: illustrates a known arrangement alternative to the arrangements of FIGS. 34 and 35;

FIG. 38: illustrates an arrangement alternative to the arrangement of FIG. 37;

FIG. 39: illustrates an embodiment of the present invention;

FIG. 40: illustrates an embodiment alternative to the embodiment of FIG. 39;

FIG. 41: illustrates an embodiment alternative to the embodiment of FIGS. 39 and 40;

FIG. 42: illustrates an embodiment alternative to the embodiment of FIGS. 39 to 41;

FIGS. 43 to 46: illustrate known arrangements;

FIG. 47: illustrates an embodiment of the present invention;

FIG. 48: illustrates a known arrangement;

FIG. 49: illustrates an embodiment of the present invention:

FIGS. 50 and 51: illustrate known arrangements;

FIGS. 52 and 53: illustrate embodiments of the present invention;

FIG. 54: illustrates a known arrangement; and

FIG. 55: illustrates an embodiment of the present invention.

Same or comparable components, parts, structures, means, device etc. are indicated by same reference numerals. Therefore, a description already given with reference to a reference numeral will generally not be repeated. Further, observations concerning a reference numeral will apply to all drawings having this reference numeral and/or associated components, parts, structures, means, device etc.

Generally, reference numerals between 2 and 98 refer to prior art, while reference numerals starting from 100 refer to the present invention.

DESCRIPTION OF PREFERRED EMBODIMENTS

Before describing embodiments with reference to the drawings, some further observations concerning different aspects of the present invention are provided.

In the device of the present invention, the first kinematics bond may comprises at least one of the following: a jointed link; a jointed parallelogram; a pivot joint; a pivot joint with remote rotation axis; a universal joint; a cardan joint; a spherical joint; a timing belt; a cable; a wire; a string; a tendon; a band; gears; a deformable solid state hinge; a deformable beam; a deformable bar; a deformable membrane; an elastic constraining element; a ball bearing; a friction bearing; surface portions in contact.

In the device of the present invention, the output member may comprises at least two rotational degrees of freedom having rotation axes, each of which being spatially offset with respect to corresponding rotation axis associated to the rotational degrees of freedom of the intermediate member provided to it by the first kinematics bond.

In the device of the present invention, the at least two rotational degrees of freedom of the output member may have rotation axes, which are intersecting in a common remote rotation center.

In the device of the present invention, the means of the second kinematics bond being adapted to provide motion on a curved surface may comprise at least one of the following: a jointed link; a jointed parallelogram; a pivot joint; a pivot joint with remote rotation axis; a universal joint; a cardan joint; a spherical joint; a timing belt; a cable; a wire; a string; a tendon; a band; gears; a deformable solid state hinge; a deformable beam; a deformable bar; a deformable membrane; an elastic constraining element; a ball bearing; a friction bearing; surface portions in contact.

In the device of the present invention, the means of the second kinematics bond being adapted to provide motion on a curved surface may comprise a link connected to the intermediate member with at least two rotational degrees of freedom on a first end and to the output member with at least two rotational degrees of freedom on the second end.

In the device of the present invention, the means of the second kinematics bond being adapted to provide motion on a curved surface may comprise a link connected to the intermediate member with two rotational degrees of freedom on a first end and to the output member with two rotational degrees of freedom on the second end, the two rotational degrees of freedom of the second end having parallel rotation axes and reversed order with respect to the two rotational degrees of freedom of the first end.

The device of the present invention may further comprise means being adapted to provide motion on a particular curved surface being a portion of a sphere for simultaneously offsetting by a same distance at least two rotation axes associated to rotational degrees of freedom provided to the intermediate member by the first kinematics bond.

In the device of the present invention, the means of the second kinematics bond being adapted to constrain at least two rotational degrees of freedom may comprise at least one of the following: a jointed link; a jointed parallelogram; a pivot joint; a pivot joint with remote rotation axis; a universal joint; a cardan joint; a spherical joint; a timing belt; a cable; a wire; a string; a tendon; a band; gears; a deformable solid state hinge; a deformable beam; a deformable bar; a deformable membrane; an elastic constraining element; a ball bearing; a friction bearing; surface portions in contact.

In the device of the present invention, the means of the second kinematics bond being adapted to constrain at least two rotational degrees of freedom may comprise a link connected to the intermediate member with at least two rotational degrees of freedom on a first end and to the output member with at least two rotational degrees of freedom on the second end.

In the device of the present invention, the means of the second kinematics bond being adapted to constrain at least two rotational degrees of freedom and the means of the second kinematics bond being adapted to provide motion on a curved surface may be a single means being adapted to jointly provide motion on a curved surface and to constrain said at least two rotational degrees of freedom.

The device of the present invention may further comprise means being adapted to constrain at least one translational degrees of freedom of the device.

In the device of the present invention, the means being adapted to constrain at least one translational degrees of freedom of the device may comprise at least one of the following: a jointed link; a jointed parallelogram; a pivot joint; a pivot joint with remote rotation axis; an universal joint; a cardan joint; a spherical joint; a timing belt; a cable; a wire; a string; a tendon; a band; gears; a deformable solid state hinge; a deformable beam; a deformable bar; a deformable membrane; an elastic constraining element; a ball bearing; a friction bearing; surface portions in contact.

In the device of the present invention, the means being adapted to constrain at least one translational degrees of freedom of the device may comprise means to constrain at least one rotational degrees of freedom of said means of the second kinematics bond being adapted to provide motion on a curved surface or of said means of the second kinematics bond being adapted to constrain at least two rotational degrees of freedom.

The device of the present invention may be adapted for actuation of at least one of its degrees of freedom.

In the device of the present invention, adaptation for actuation of at least one of its degrees of freedom may comprise at least one of the following: a rotative actuator; a linear actuator; an electrical DC motor; an electrical brushless motor; a piezo-electrical actuator; a stick and slip actuator; an inertial drive actuator; an impact drive actuator; an ultra-sound actuator; a voice-coil actuator; a moving magnet actuator; a hydraulic actuator; a pneumatic actuator; a direct drive actuator; a transmission stage; gears; a timing belt; a cable; a band; a screw drive; an elastic constraining element.

The device of the present invention may be adapted to transmit actuated motion of at least one externally provided degree of freedom through at least one of its constrained degrees of freedom.

In the device of the present invention, the first kinematics bond and the input member may be a part of a parallel or hybrid kinematics structure.

The device of the present invention may comprise at least one sensor coupled to at least one of its degrees of freedom.

In the device of the present invention, the at least one sensor coupled to at least one of its degrees of freedom may comprise at least one of the following: a position sensor; a distance sensor; an orientation sensor; an angle sensor; an incremental sensor; an encoder; a tachymeter; an electrical sensor; an end-stop sensor; a absolute reference sensor; an initialization sensor; a calibration sensor; an optical sensor; an optical fiber; a laser beam; a laser interferometer; a magnetic sensor; a Hall effect sensor; a capacitive sensor; an accelerometer; a gyroscopic device; a deformation sensor; a displacement sensor; a strain gage; a force sensor; a torque sensor; a multiple degree of freedom sensor; an electrical signal amplifier; a filtering device; a signal conditioning device.

The device of the present invention may be coupled to a control unit.

In the device of the present invention, the input member may be adapted to be coupled to ground or a mounting surface.

In the device of the present invention, the output member may be adapted to be coupled to a terminal member for receiving at least one of the following devices: an instrument; a tool; a gripper; an antenna; a sensor; an endoscope; an optical guide; a camera; a laser; a X-ray gun; an ultrasound probe.

According to a further aspect, the present invention provides an arrangement comprising a parallel or hybrid kinematics structure providing at least six degrees of freedom; and the device of the present invention being incorporated in said kinematics structure.

According to a further aspect, the present invention provides an arrangement comprising the device of one of the present invention being incorporated in one of the following: a serial kinematics structure; a parallel kinematics structure; a hybrid kinematics structure; a robot or industrial robot; a manipulator; a passive constraining device or joint; a path generation device; a user input device; a medical device (e.g. for use in neurological, maxillofacial, dental, eye, cervical, orthopedic, vertebral, abdominal, thorax, basin, urological, gynecological, therapeutical, diagnostic, operative, surgical applications); a holding device (e.g. for an instrument, tool, gripper, antenna, sensor, endoscope, optical guide, camera, laser, X-ray gun, ultra-sound probe, biological tissue, human body part); a wrist structure; a machine tool (e.g. for machining, grinding, milling, drilling, polishing, gas torch cutting, laser cutting, water jet cutting); a mobile platform; a vehicle (e.g. submarine, in pipe, terrestrial, airborne, space); a micromanipulator; a nano-manipulator; a telemanipulator (as master input and/or slave device); a steering device; a pointing device a control console; a command center; a cockpit; a haptic device for providing active tactile and/or force feedback to a user; a passive and/or active back-drivable device; a non back-drivable device; a statically and/or dynamically balanced device; an actively and/or passively gravity compensated device; a calibrated device; a simulation, learning or training device; a gesture assessment and/or certification device; a compliant and/or shock-absorbing mechanism; a guiding device; a lockable device; an active guiding and/or selectively compliant device; an implantable device; an exoskeleton device; a minimal invasive surgery device; a micro-surgery device; a sterilizable device; a rehabilitation and/or exercising device; an orthosis device; a human assistive device; a home care device; a home appliance device; a housekeeping device; a kitchen device; a furniture mechanism (e.g. chair, drawer, folding table, bed, window); a heavy load mechanism (e.g. truck, civil engineering construction machine, crane); a vibrating device; a vibration damping and/or shock absorbing device; an inertial device; a measurement and/or sensing device; a positioning and/or alignment device; a contact following and/or force application device; a high precision device; a part handling or part transfer device; a painting and/or coating device; a dispensing and/or pipetting device (e.g. for adhesives or lubricants in liquid, gel, foam or cream state); a packaging device; a palletizing device; a piece goods handling device; a packaging device; a microelectronics industry device; a food industry device; an inspection and/or exploration device; a testing device; a quality control device; a shock, resistance and/or wear testing device; a data acquisition device; a monitoring device; a welding device; a soldering device; a brazing device; a assembly and/or manufacturing device; a gaming, entertainment and/or consumer grade device; a demonstration, exhibition and/or educational device; an artistic or aesthetical device; a compact, self-powered, portable, mobile and/or wearable device; an engine; an energy transformation device; a military device or weapon component.

FIG. 3 illustrates a known serial kinematics arrangement in form of an industrial robot arm 2. Robot arm 2 has three pivot joints 4, 6 and 8 having a total of three DOF. These DOF include two translational DOF 10 and 12 in a plane corresponding with the drawing plane and one rotational DOF around an axis perpendicular to this plane.

Pivot joint 4 is connected with an input member 14, which is in turn connected with ground 16. Pivot joint 8 is connected to an output member 18. The free end of output member 18 defines a tool center point (TCP) 20.

TCP 20 is located offset from or remote to pivot joint 8 that represents the structure's wrist joint by a distance c.

FIG. 4 illustrates the kinematics arrangement of FIG. 3 in a posture after clockwise rotation of output member 18 around TCP 20. In order to accomplish such a clockwise rotation around TCP 20 without translational movement of TCP 20, the pivot joints 4 and 6 of robot arm 2 provide for compensation in this regard by moving wrist joint 8 on a circular path 22 around TCP 20. This results in a reduction of translational work space and dexterous space.

FIG. 5 illustrates an arrangement comparable to the arrangement of FIG. 3 and FIG. 4, respectively, apart from its increased rotational motion range provided around the TCP 20 located in the center of wrist joint 8. Such an arrangement does not require compensation of translational movements with respect to TCP 20, since TCP 20 is located in one of the arrangement's three inherent rotation centers (RC), which are located in the RC of the three pivot joints. However, physical accessibility of TCP 20 is greatly reduced or even impossible.

In FIG. 5, since pivot joint (wrist joint) 8 and TCP 20 coincide and therefore mechanically interfere, the gripper symbol on the output member 18 has not been represented.

FIG. 6 illustrates an arrangement being kinematically equivalent to the arrangement of FIG. 5. The arrangement of FIG. 6 comprises a wrist joint 24 different from wrist joint 8 of FIGS. 3 to 5. Wrist joint 24 provides, as compared with wrist joint 8, an inherent remote rotation center (RRC) capability thereby offering improved accessibility to TCP 20. Since one of the arrangement's inherent RC located in the RC of wrist joint 24 and the TCP 20 coincide, no compensation of translational movements at TCP is required. This is illustrated in FIG. 7, which shows the arrangement of FIG. 6 in a posture after clockwise rotation of output member 18 around TCP 20. From FIG. 7, it is evident that no compensation of translational movements occurs in the arrangement as a whole since the wrist joint 24 provides RRC capability locally.

While FIGS. 6 and 7 illustrate arrangements incorporating a specific embodiment of an RRC pivot joint in form of a curved gliding portion of an annulus, FIG. 8 shows an alternate embodiment of an RRC pivot joint in form of a parallel arrangement having a pantograph linkage. This arrangement comprises an input member 14 coupled to ground 16 and an output member 18 at a remote end of which a TCP 20 is located, Pivot joints 26 to 38 couple input member 14 and output member 18 and provide the one DOF rotational movement of the output member 18 of this arrangement with respect to its input member 14. The RRC pantograph linkage of FIG. 8 has the advantage of including only pivot joints and could be included by substitution in robot arm of FIGS. 6 and 7 as a sub-structure (or component) in place of any at least one of its pivot joints, in particular its RRC wrist joint 24.

While in the above figures, arrangements using joints providing one rotational DOF are illustrated, FIG. 9 illustrates an arrangement using joints, which provide two rotational DOF. Examples for such joints include universal joints and cardan joints as well as sub-structures of two pivot joints arranged in series. In particular, the arrangement of FIG. 9, which may be considered as spatial robot arm, comprises joints 40, 42 and 44 each having two rotational DOF. Joint 40 is connected to an input member 14, which in turn is connected to ground 16. Joint 44 is coupled with an output member 18. At the free end of output member 18, a TCP 20 is provided. TCP 20 is chosen, as may be derived from FIG. 9, at a location offset or remote from joint 44 that may be referred to as wrist joint (i.e. the last joint, looking in a direction from input member 14 towards output member 18, of the kinematics chain provided by the illustrated arrangement). More specifically TCP 20 is offset from wrist joint 44 by a distance c. While wrist joint 44 may be defined as one of the arrangement's inherent rotation center RC, the location of TCP 20 can be referred to as remote rotation center RRC with respect to the arrangement.

In order to accomplish rotational movements of output member 18 around TCP 20 without translational movements of TCP 20, the arrangement of FIG. 9 is operated such that wrist joint 44 is moved on a spherical surface to compensate for translational movements of TCP 20. This spherical surface is illustrated in FIG. 9 by lines 46.

The above observations and the referenced figures have been included in order to promote an understanding of the present invention, particularly with regard to the inventive solution to provide rotational movements around a RRC with at least minimized or no translational movements thereof.

FIG. 10 illustrates, in rather general manner, components and functional elements, respectively, of the present invention. FIG. 10 illustrates a basic embodiment having an input member 100, a first kinematics bond 102, an intermediate member 104, a second kinematics bond 106 and an output member 108. First kinematics bond 102 couples input member 100 and intermediate member 104 and provides at least two rotational DOF, Second kinematics bond 106 couples intermediate member 104 and output member 108 and is adapted to transmit rotational motions as well as to offset rotation axes of at least two rotational DOF simultaneously.

In greater detail, second kinematics bond 104 comprises means 110 for providing motion on a curved surface and means 112 constraining at least two rotational DOF between intermediate member 104 and output member 108.

In general, the present invention may be implemented, for example, in a robotics structure. To this end, FIG. 11 illustrates, for a general understanding and description of the present invention, an embodiment of the present invention 114 (e.g. as illustrated in FIG. 10) comprising a first kinematics bond 102, an intermediate member 104, a second kinematics bond 106 having means 110 for providing motion on a curved surface and means 112 constraining at least two rotational DOF. For practical implementation, the invention 114 may be arranged between input member 100 and output member 108. Input member 100 may be, for example, coupled or connected to ground 116 or any other fixed location, or, as an alternative, to a movable location, for example, provided at the end effector of a robot. Output member 108 comprises at its end opposite to the invention 114 an end-effector 120 which defines a TCP 118. TCP 118 represents a RRC (reference numerals for TCPs may be also used for associated RRCs).

It is noted that ground or any other mounting structure and a TCP are considered as "local" input member and "local" output member, respectively. This is to consider embodiments wherein a structure arranged between TCP and ground are part of a larger structure. In such cases, the TCP may be coupled with one or more further components that in turn itself may be considered as "local" input member. Comparable thereto, ground may be coupled with one or components that, in turn, itself may be considered as "local" output member.

In order to explain an embodiment of the present invention, now it is referred to FIGS. 12 and 13 both illustrating known arrangements.

FIG. 12 shows an arrangement having a rigid link 48 terminated at each of its ends by a joint 50, 52 each providing at least two rotational DOE In FIG. 12, joints 50 and 52 are exemplary illustrated by a cardan or universal joint; however, joint 50 and/or joint 52 may have non-intersecting rotation axes or more than two DOF. The arrangement of FIG. 12 can be commonly found as a sub-structure or component in robotic structures (e.g. the sub-structure consisting of the two joints 42 and 44 of the arrangement of FIG. 9). The arrangement of FIG. 12 has a TCP 20, which is provided with two rotational DOF and two translational DOF on a spherical surface having a radius r.

FIG. 13 shows a structure (e.g. schematic illustration of a robot) that is kinematically equivalent to the arrangement of FIG. 12. In FIG. 13, in place of joint 52 of FIG. 12, a different wrist joint 54 is used. Wrist joint 54 has a two DOF RRC capability illustrated by two distinct RRC pivot joints 56 and 58. Pivot joints 56 and 58 may be respectively compared with joint 24 of FIG. 6.

The arrangements of FIGS. 12 and 13 have problems discussed at the beginning. In order to overcome their drawbacks, an embodiment of the present invention illustrated in FIG. 14 may be used. The embodiment of FIG. 14 comprises an input member 100 coupled to ground 116, a first kinematics bond 102 coupled with input member 100, an intermediate member 104 arranged between first kinematics bond 102 and a second kinematics bond 106, an output member 108 arranged between second kinematics bond 106 and an end effector 120.

First kinematics bond 102 provides at least two rotational DOF. As shown on FIG. 14, first kinematics bond 102 may comprise a universal or cardan joint 256.

Second kinematics bond 106 has a means 110 for providing motion on a curved surface and means 112 for constraining at least two rotational DOF. The means 110 comprises a link 122 coupled at its ends with a joint 124 and a joint 126. Therefore, a link 122 may be also referred to as jointed link and provides, by means of its jointed arrangement, motion on a curved (e.g. spherical) surface. Joints 124 and 126 provide at least two rotational DOF and may be, for example, universal joints and/or cardan joints, as shown in the illustrated embodiment. Here, means 110 further constrains one rotational DOF around longitudinal axis of jointed link 122.

Means 110 for providing motion on a curved surface can be equivalently considered as means to constrain at least one translational DOF in a direction, which is perpendicular to the local tangent plane at any given point on this curved surface. In the illustrated embodiment, jointed link 122 provides this at least one translational DOF constraint in direction of its own longitudinal axis, which remains perpendicular to the curved surface on which output member 108 can move relatively to intermediate member 104.

Means 112 comprises two links 128 and 130. Link 128 is coupled at its end with a joint 132 and a joint 134, while link 130 is coupled at its end with a joint 136 and the joint 138. Joints 132, 134, 136 and 138 provide at least two rotational DOF, In the illustrated embodiment, joints 132 and 136 respectively provide two rotational DOF and may be in form of a universal or cardan joint, while joints 134 and 138 are exemplary illustrated as joints each having three rotational DOF (e.g. by using a spherical joint). Due to their arrangements between joints, links 128 and 130 may be referred to as jointed links and are capable of constraining at least two rotational DOF between intermediate member 104 and output member 108. In the illustrated embodiment, jointed links 128 and 130 constrain two rotational DOF.

End effector 120 has a TCP 118 that coincides with the RRC of the shown embodiment. RRC 118 (TCP 118) has two rotation axes 140, 142, which represent remote rotation axes.

In the illustrated embodiment, means 112 comprises two jointed links 128 and 130. It is to be noted that in not shown embodiments means 112 may include additional jointed links, for example, to improve stiffness.

In the illustrated embodiment, the components coupling the shown joints have longitudinal axes, which are parallel and/or orthogonal with respect to each other. Such components may be, for example, formed by bars. Particularly, the parallel longitudinal axes contribute in rotational movements of TCP 118 without translational movements. However, in not shown embodiments, one or more of the components, which have parallel longitudinal axes in FIG. 14, may have non-parallel longitudinal axes. In dependence of a deviation of a longitudinal axis from a parallel arrangement, rotational movements of TCP 118 may also result in some translational movements. However, even in such cases, translational movements are significantly smaller compared with the prior art.

Further, the embodiment of FIG. 14 is designed such that the translational DOF of TCP 118 are provided on a spherical surface having a radius r. This is, in the illustrated embodiment, achieved by using jointed links 122, 128 and 130 having a longitudinal length of r. Further, to this end, the distance between the rotation center of first kinematics bond 102 and TCP 118 is also chosen to be r.

By using this dimensioning, a "perfect" round rotation of output member 108 around TCP 118 is achieved, i.e. without translational movements. In such cases, deviations of rotations of TCP 118 from a perfect circular movement may result from manufacturing tolerances in the joints and/or the components coupling the joints; also the mechanical stiffness of the components coupling the joints may contribute to such deviations. In case of unequal longitudinal lengths r of jointed links 122, 128 and 130, rotational movements of TCP 118 may also result in some translational movements. However, even in such cases, translational movements are significantly smaller compared with the prior art.

Figure 15:
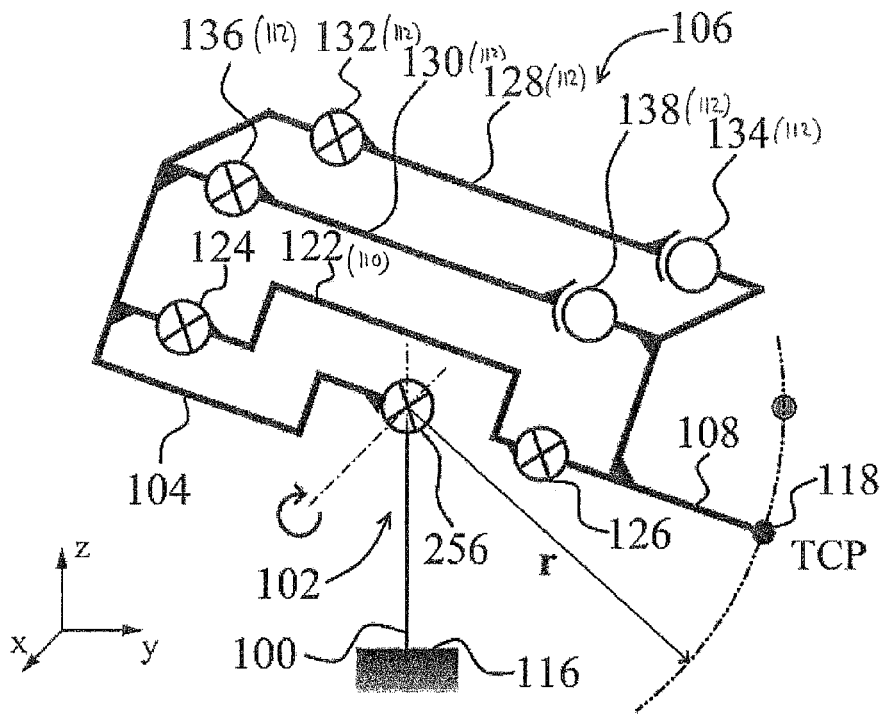
FIG. 15 shows the embodiment of FIG. 14 in a posture after clockwise rotation around the x axis in the first kinematics bond 102. Such a rotation results in a coupled movement of TCP 118, namely rotation and translation on a circular path of a radius r corresponding to the distance between TCP 118 and the rotation axis in first kinematics bond 102.
Figure 16:
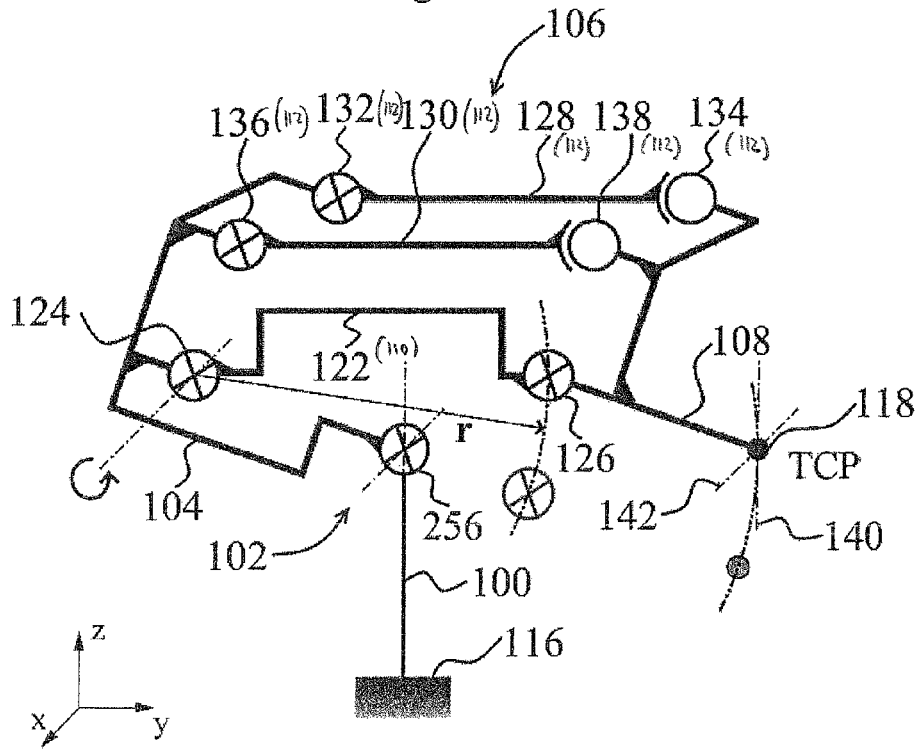
FIG. 16 shows the embodiment of FIG. 14 in a posture after a translation on a circular path provided in second kinematics bond 106 starting from the posture shown in FIG. 15. This movement of the embodiment compensates the coupled translational movement of TCP 118 resulting from the initial rotation leading to the posture of FIG. 15.
Figure 17:
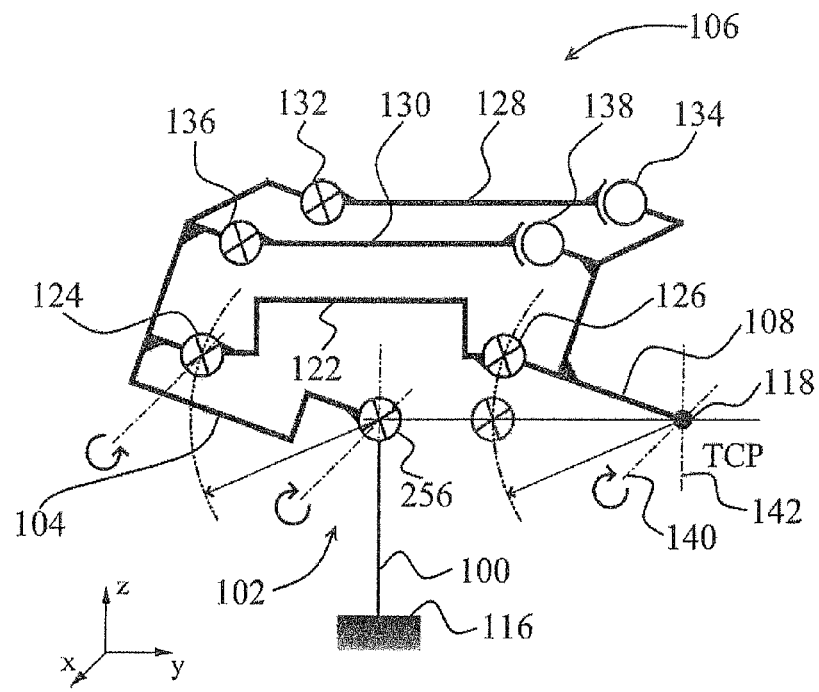

As apparent of FIGS. 15 and 16, a combination of the movements of these figures provides for a pure rotational movement of TCP 118 without the need for compensating translational movements thereof. This is illustrated in FIG. 17 showing the above movements in first kinematics bond 102 and second kinematics bond 106 as combined movement leading to a rotation of remote TCP 118 around its x axis 140 without translational movements of TCP 118 and, thus, no need for compensation of translational movements of TCP 118. As a result of the design of the illustrated embodiment, the three jointed links 122, 128 and 130 of second kinematics bond 104 remain at constant orientation during rotation of remote TCP 118.

Figure 14:
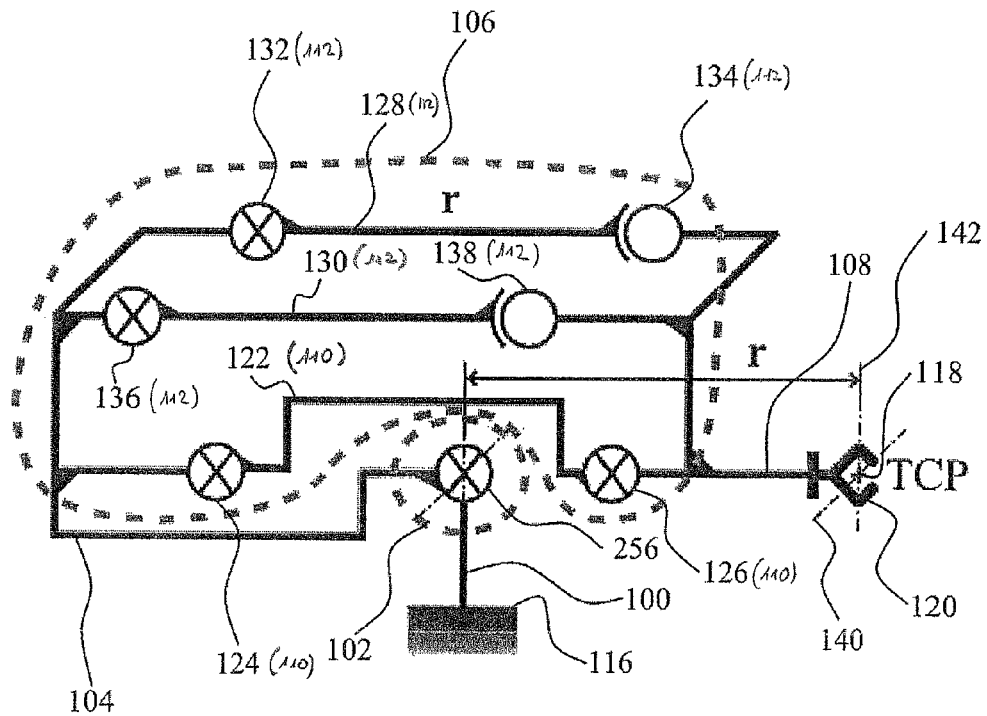
Figure 18:
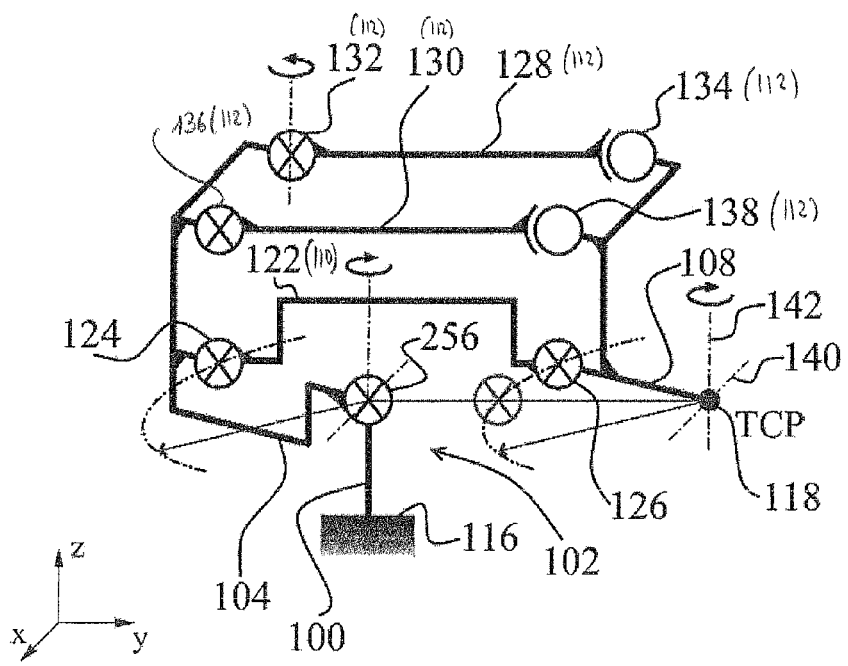

FIG. 18 shows the embodiment of FIG. 14 in a posture after a combined movement in first kinematics bond 102 and second kinematics bond 104 around their associated z axes. It should be noted that rotations around x and z axes may be achieved simultaneously. The combined movement in first and second kinematics bonds 102 and 106 shown in the drawing results in a rotational movement of TCP 118 around its z axis 142 without any component of translational movement.

Figure 19:
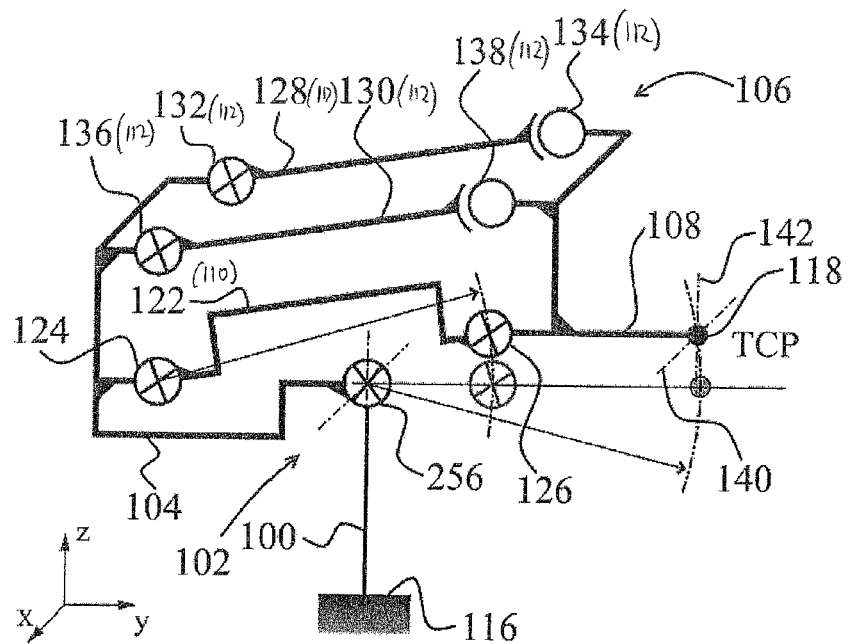

FIG. 19 shows the embodiment of FIG. 14 in a posture after a translation of TCP 118 along a circular path resulting from a movement in second kinematics bond 106. Such a movement in second kinematics bond 106 involves a change in orientation of the jointed links 122, 128 and 130. However, the orientation of TCP 118 remains unchanged since it is controlled by first kinematics bond 102, which also remains in constant orientation.

Figure 20:
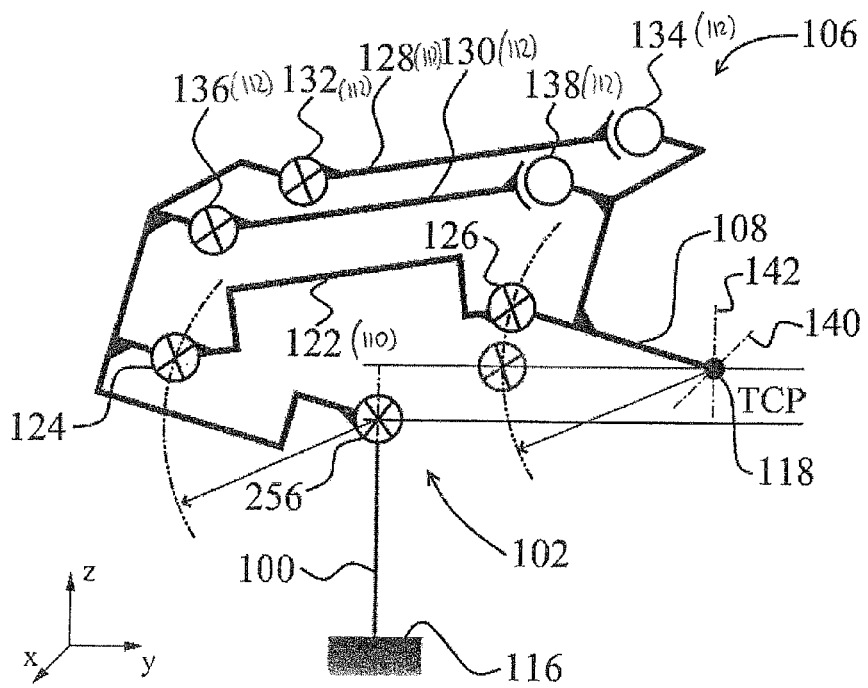

FIG. 20 shows the embodiment of FIG. 14 in a posture after a rotation of TCP 118 around its translational shifted position starting from the posture shown in FIG. 19. The rotation of FIG. 20 is achieved by rotation in first kinematics bond 102. As can be derived from FIG. 20, the rotational movement of TCP 118 does not affect its translational movement since—according to the present invention—rotational and translational movements of a TCP are decoupled (in the embodiment of FIG. 14, rotational and translational movements are entirely decoupled).

Figure 13:
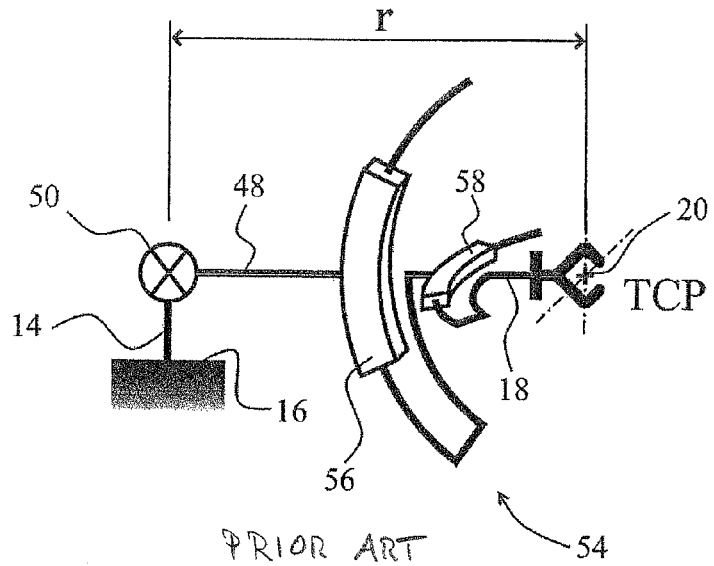

In comparison with the structure of FIG. 13, the embodiment of FIG. 14 gives access to the two rotational wrist DOF through the first kinematics bond, which is advantageously located on or coupled with the input member (e.g. close to ground) and/or arranged in a decoupled way from the translational DOF. Contrary thereto, in the arrangement of FIG. 13, the joint on the input member controls the translational DOF of the TCP inherently coupled to rotational movements of the TCP.

Figure 21:
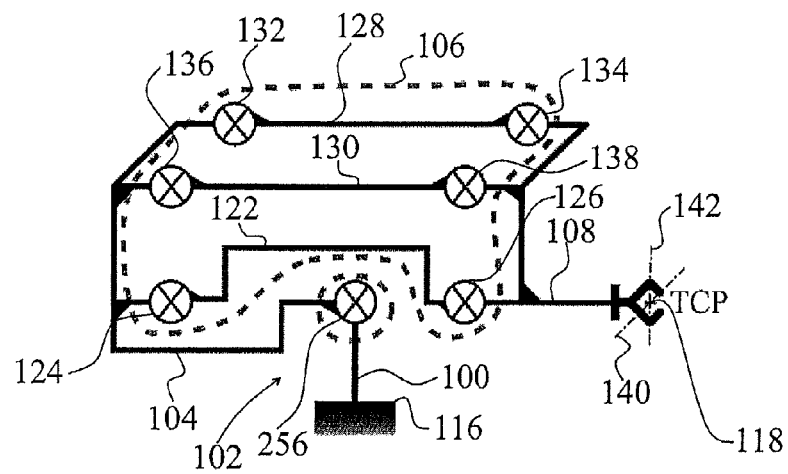

FIG. 21 illustrates a further embodiment of the present invention kinematically equivalent to the arrangement of FIG. 14 and differing therewith in one main aspect, Here, means 112 for constraining at least two rotational DOF of second kinematics bond 106 uses joints 134 and 138 each having two DOF, while joints 134 and 138 in embodiment of FIG. 14 each have three DOF. These joints 134 and 138 may include, for example, cardan joints and/or universal joints. In this embodiment, means 112 constrains exactly three rotational DOF, one of which is (according to the illustration already) constrained by jointed link 122 in means 110 for providing motion on a curved surface. This results in an over-constrained kinematics arrangement that has the same geometrical behavior as the embodiment of FIG. 14, however, with a simpler structure.

Figure 22:
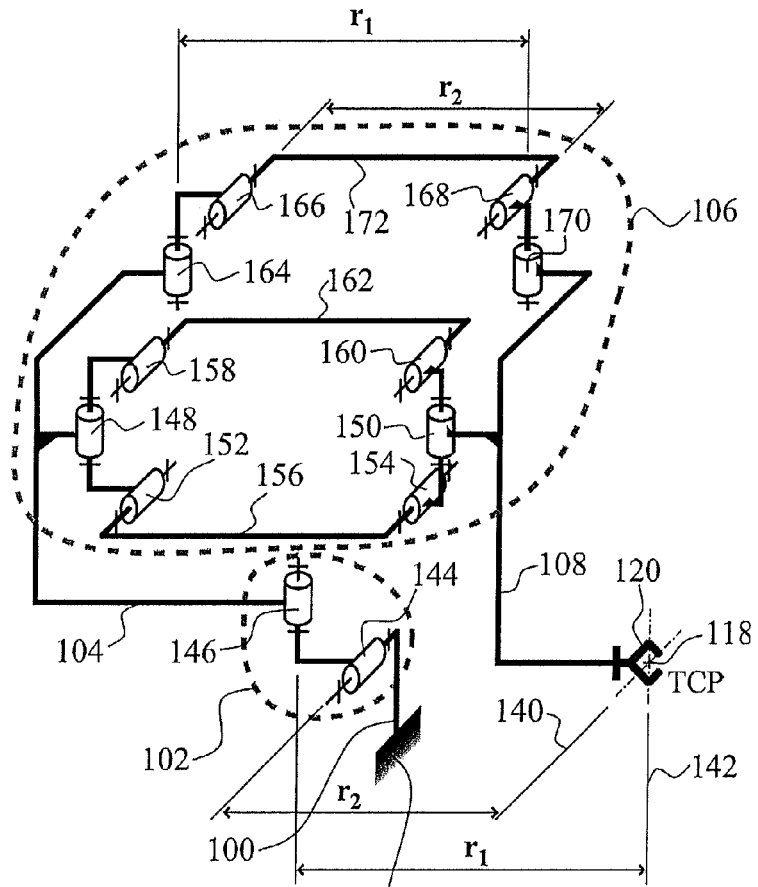

FIG. 22 illustrates a further embodiment of the present invention differing from the embodiment of FIG. 21 in several aspects. Here, first kinematics bond 102 comprises two joints each providing a single rotation DOF, for example, the shown pivot joints 144 and 146. In the second kinematics bond 106, the means 110 for providing motion on a curved surface and the means 112 for constraining at least two rotational DOF share two common joints 148 and 150. In the illustrated embodiment, common joints 148 and 150 are oriented along the z axis. Due to common joints 148 and 150 the embodiment of FIG. 22 may be considered to jointly provide (in other words, to provide in integral form) the means 110 for providing motion on a curved surface and the means 112 for constraining at least two rotational DOF. For such embodiments, the means 110 for providing motion on a curved surface and the means 112 for constraining at least two rotational DOF may be referred to as a single means or a means structurally and/or functionally integrating means 110 and means 112.

The function of the means 110 for providing motion on a curved surface is further provided by joints 152 and 154 and a jointed link 156 arranged therebetween.

Further functions of the means 112 for constraining at least two rotational DOF are further provided by joints 158 and 160 and a jointed link 162 arranged therebetween as well as by joints 164 and 166 and joints 168 and 170 and a jointed link 172 arranged between these joint pairs.

Jointed links 156, 162 and 172 of FIG. 22 may be compared with the above jointed links 122, 130 and 128, respectively.

Further, it is noted that some of the joints (e.g. universal joints and/or cardan joints) of the embodiment of FIG. 22 have non-intersecting rotation axes, which can lead to an improved compactness or simplicity of the mechanical design. This could generally lead to some translational movements of TCP 118 during rotational movement thereof. However, if geometrical relations as those illustrated in FIG. 22 are provided, rotational movements of TCP 118 do not result in translational movements thereof. As a result, no compensation of such translational movements is necessary. In the illustrated embodiment, such geometrical relations are achieved, inter alia, by the shown dimensions $r_1$ and $r_2$.

If compared with embodiment of FIG. 21, embodiment of FIG. 22 is a kinematics arrangement over-constrained to a higher degree and results in an even simpler structure.

Figure 23:
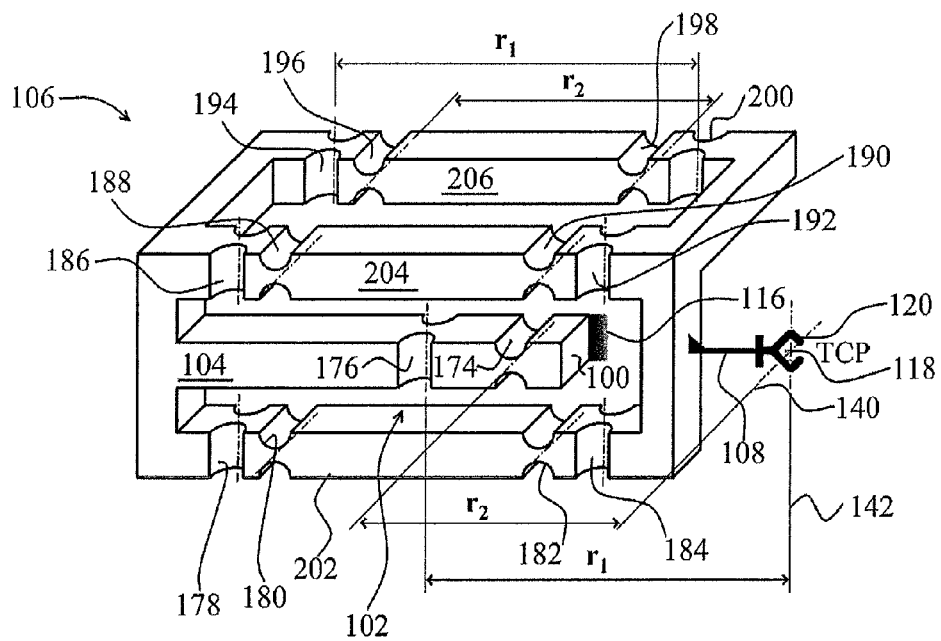

The above observations given with respect of FIGS. 21 and 22 also apply to FIG. 23 although the embodiment of FIG. 23 differs from the embodiments of FIGS. 21 and 22. The differences include that the joints used in the embodiment of FIG. 23 are realized as solid-state elastically deforming flexure hinges.

In particular, input member 100 is coupled with a first kinematics bond 102 comprising flexure hinges 174 and 176, which hinges may be considered—with respect to their function—to correspond with hinges 144 and 146 of FIG. 22. Intermediate member 104 is coupled with a flexure hinge 176. Second kinematics bond 106 comprises flexure hinge pairs 178, 180; 182, 184; 186, 188; 190, 192; 194, 196; and 198 and 200, which correspond with joints 124, 126, 136, 138, 132 and 134 of FIG. 21 respectively. These hinge pairs are coupled by jointed links 202, 204 and 206, which correspond with jointed links 122, 130 and 128 of FIG. 21 respectively.

Flexure hinges 182, 184; 190, 192; and 198, 200 are coupled with an output member 108. At the free end of output member 108 an end effector 120 having a TCP 118 is provided.

As in the above embodiments, also in the embodiment of FIG. 23, rotational movements of TCP 118 do not induce translational movements thereof and, thus, no respective compensation is necessary. To avoid translational movements resulting from rotational movement of TCP 118, it is preferred to use geometrical relations as illustrated in FIG. 23, particularly with respect to the dimensions indicated by $r_1$ and $r_2$.

It is to be noted that depending on specific hinge design and rotational movement amplitude, small deviations to the "perfect" round rotation of TCP 118 may occur.

Figure 24:
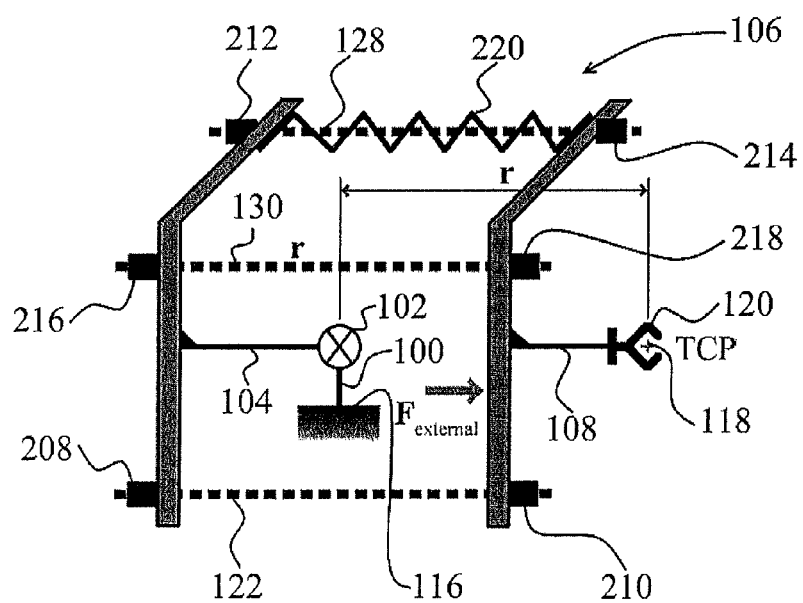

The embodiment of FIG. 24 comprises, comparable to the preceding embodiments, an input member 100, a first kinematics bond 102, an intermediate member 104, a second kinematics bond 106, an output member 108 and an end effector 120 having a TCP 118. Here, second kinematics bond 106 uses, as jointed links, links, including, for example, wires, cables, tendons, strings or the like. Due to their comparable functions, reference numerals 122, 128 and 130 are here used also. Jointed links 122, 128 and 130 of FIG. 24 are, in the illustrated embodiment, terminated by end-stops 208 and 210 for jointed link 122, end-stops 212 and 214 for jointed link 128 and end-stops 216 and 218 for jointed link 130. Due to this design, jointed links 122, 128 and 130 transmit tensile forces stiffly.

The embodiment of FIG. 24 further includes a pretension means 220, for example, including an elastic or spring element. Pretension means 128 is operatively coupled with one jointed link, here, jointed link 128. In further not shown embodiments, more than one pretension means may be used and/or a pretension means may be operatively coupled to more than one jointed link. Forces generated by the pretension means and/or at least one an externally applied force (e.g. gravity) may be used to pretension any, at least one of the jointed links, here for example jointed links 122 and 130.

The use of pretension means 128 can for example lead to reduce or even annihilate mechanical play in the jointed links, to increase stiffness or to transmit compressive forces in the jointed links.

Figure 25:
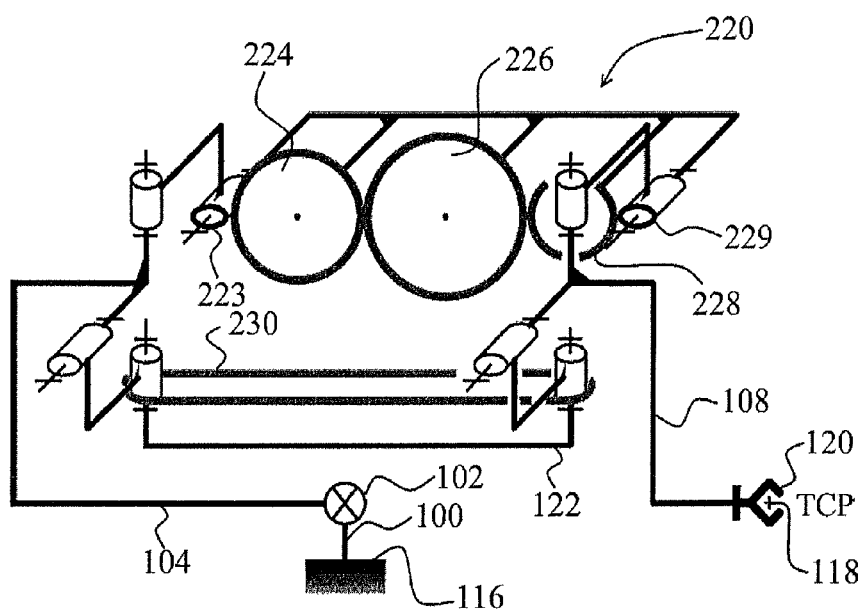

The further embodiment illustrated in FIG. 25 also includes an input member 100, a first kinematics bond 102, an intermediate member 104, a second kinematics bond 106, an output member 108 and an end effector 120 having a TCP 118. The embodiment of FIG. 25 may be compared with the embodiment of FIG. 14 insofar as second kinematics bond 106 comprises means 110 for providing motion on a curved surface in form of a jointed link 122 and means 112 for constraining at least two rotational DOF. However, in contrast to the embodiment of FIG. 14, the embodiment shown here uses a gear arrangement for constraining one rotational DOF as part of the means 112 for constraining at least two rotational DOF. According to the illustration, the gear arrangement 220 comprises a non-inverting gear transmission, for example, based on an odd number of gears 223, 224, 226, 228 and 229 exemplary arranged in series. Gears 223 and 229 are coupled with respective joints (see FIG. 25) to be moved therewith. For constraining a further rotational DOF, the means 112 for constraining at least two rotational DOF in second kinematics bond 106 comprises, as exemplary embodiment, a timing belt 230.

Figure 26:
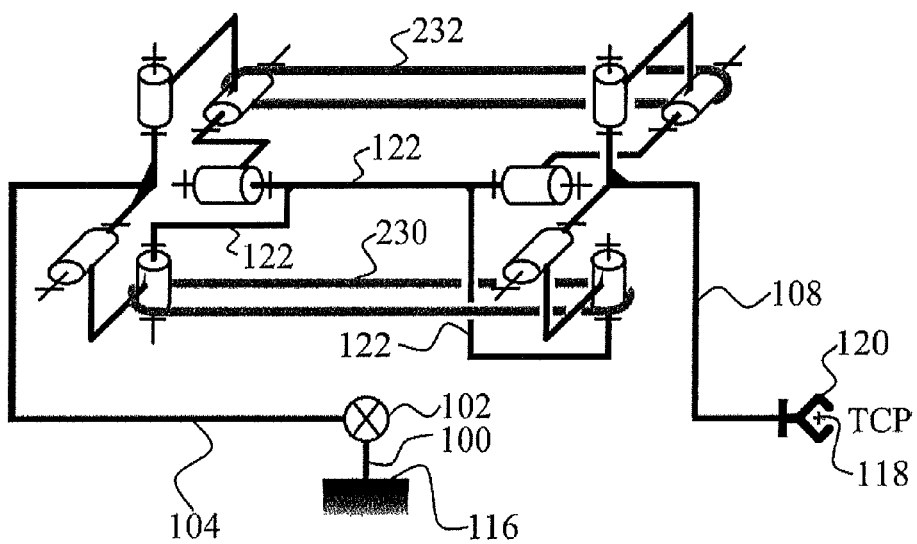

The further embodiment of FIG. 26 may be compared with the embodiment of, for example, FIG. 14 apart from the means 112 for constraining at least two rotational DOF. Here, two timing belts 230 and 232 are used, each of which constrains one rotational DOF. Timing belts 230 and 232 may be compared with the jointed links 128 and 130 described above with reference to the means 112 for constraining at least two rotational DOF insofar as they provide similar functionality.

Figure 27:
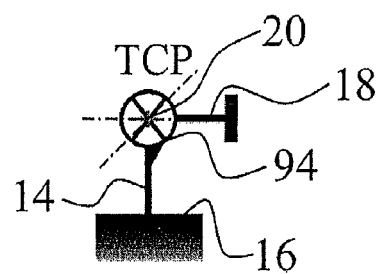
Figure 28:
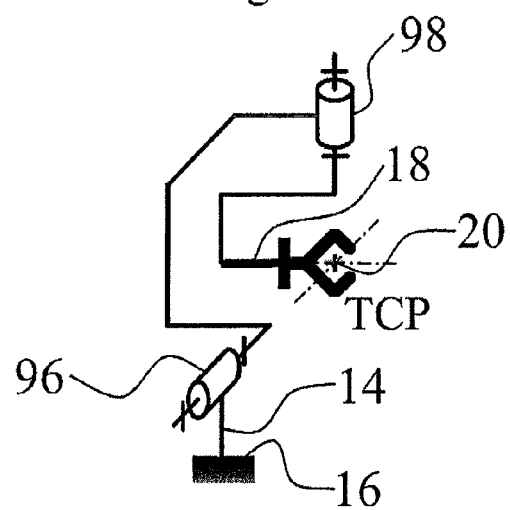

For describing further embodiments of the present invention now it is referred to FIGS. 27 and 28 showing known arrangements, commonly found in robotics structures.

FIG. 27 shows a universal or cardan joint 94 providing two rotational DOF to a TCP 20. As alternative to FIG. 27, FIG. 28 shows a structure having two distinct pivot joints 96 and 98 arranged in series. This arrangement also provides two rotational DOF for TCP 20.

Figure 29:
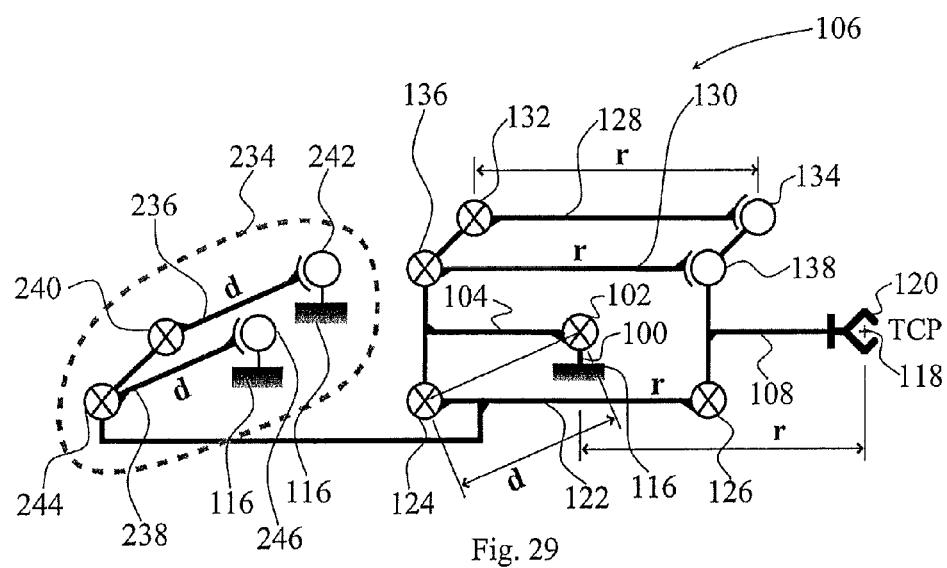

The embodiment of FIG. 29 has an input member 100, a first kinematics bond 102, an intermediate member 104, a second kinematics bond 106, an output member 108 and an end effector 120 having a TCP 118. Here, the second kinematics bond 106 comprises, in addition to the components 122 to 138, an additional means 234. The additional means 234 includes jointed links (e.g. in form of bars) 236 and 238 arranged between joints 240 and 242 and joints 244 and 246, respectively. Apart from additional means 234, the embodiment of FIG. 29 essentially corresponds with the embodiment of FIG. 14. The additional means 234 constrains two translational DOF of the remaining arrangement (in other words, two translational DOF of an embodiment according to FIG. 14). In particular, this constraint is achieved by constraining two rotational DOF of the jointed links provided in the second kinematics bond 106. In the embodiment shown here, additional means 234 constrains two rotational DOF of jointed link 122. As discussed above in relation with FIG. 17, constant orientation of jointed links 122, 128 and/or 130 constrains translational movement at TCP 118.

The embodiment of FIG. 29 provides exactly two rotational DOF to output member 108 around its TCP 118, constraining all other DOF, as it is the case for the universal joint 94 illustrated in FIG. 27 or for the pivot joint arrangement shown in FIG. 28. Therefore, the arrangements of FIGS. 27 and 28 may be replaced in common robotic structures by the present invention, as for example in its embodiment of FIG. 29.

To avoid translational movements resulting from rotational movement of TCP 118, it is preferred to use geometrical relations as illustrated in FIG. 29, particularly with respect to lengths and parallelism of links indicated by d and r.

Figure 30:
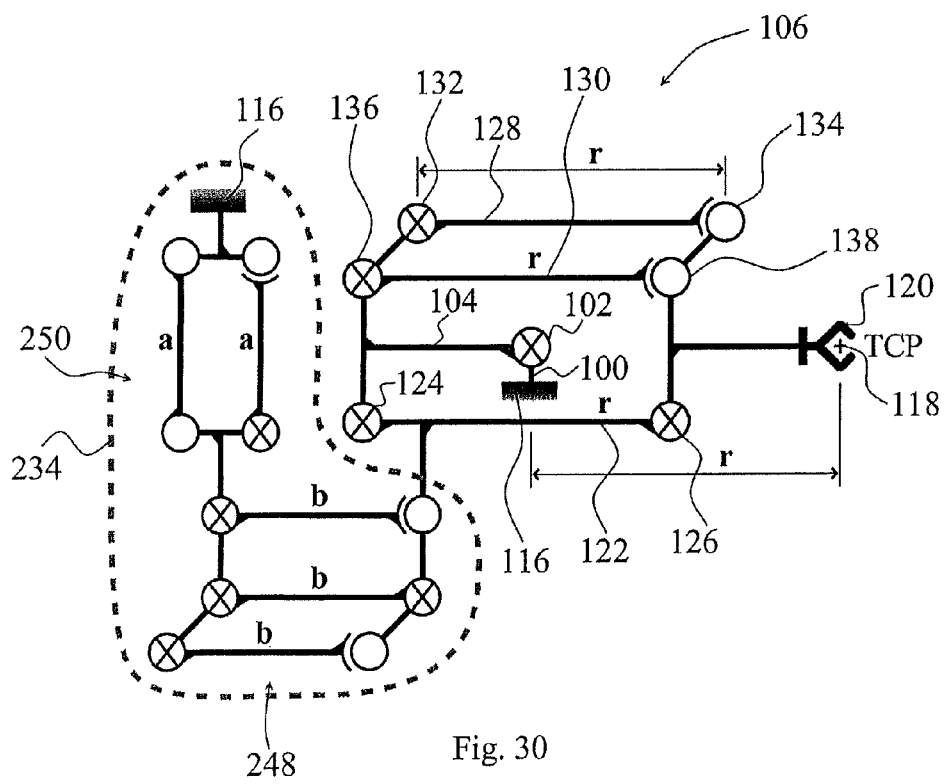

The further embodiment of FIG. 30 may be compared with the embodiment of FIG. 29 apart from the additional means 234, which is also designed to constrain two translational DOF of the remaining arrangement of the embodiment of FIG. 30 (in other words, to constrain two translational DOF of an embodiment according to FIG. 14). Here, the additional means 234 comprises, as illustrated, two parallelograms 248 and 250, which provide for constraining two translational DOF of the remaining arrangement. Parallelogram 250 has two jointed bars and parallelogram 248 has three jointed bars. In particular, this constraint is achieved by constraining two rotational DOF of the jointed links provided in the second kinematics bond 106. In the embodiment shown here, additional means 234 constrains two rotational DOF of jointed link 122. As discussed above in relation with FIG. 17, constant orientation of jointed links 122, 128 and/or 130 constrains translational movement at TCP 118.

The embodiment of FIG. 30 provides exactly two rotational DOF to output member 108 around its TCP 118, constraining all other DOF, as it is the case for the universal joint 94 illustrated in FIG. 27 or for the pivot joint arrangement shown in FIG. 28. Therefore, the arrangements of FIGS. 27 and 28 may be replaced in common robotic structures by the present invention, as for example in its embodiment of FIG. 30.

To avoid translational movements resulting from rotational movement of TCP 118, it is preferred to use geometrical relations as illustrated in FIG. 30, particularly with respect to lengths and parallelism of links indicated by a, b and r.

For describing further embodiments of the present invention now it is referred to FIG. 31 to FIG. 35 showing known arrangements, commonly found in robotics structures.

Figure 31:
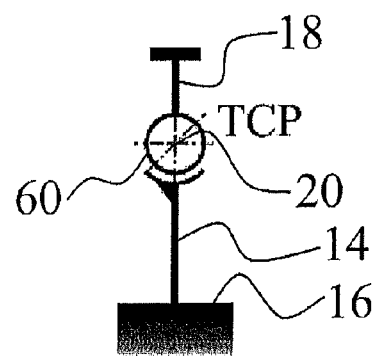
Figure 32:
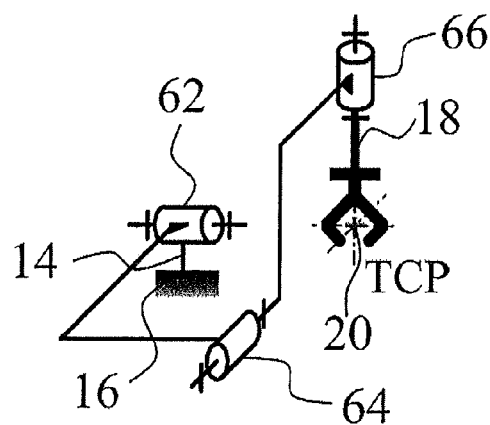
Figure 33:
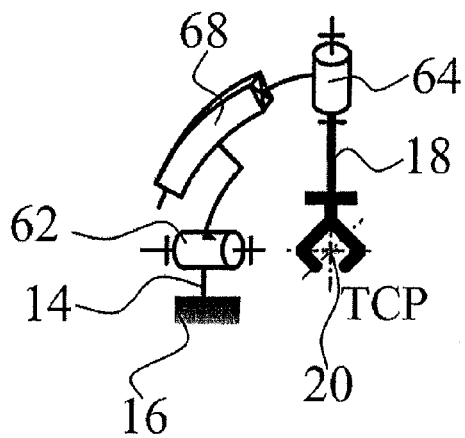
Figure 34:
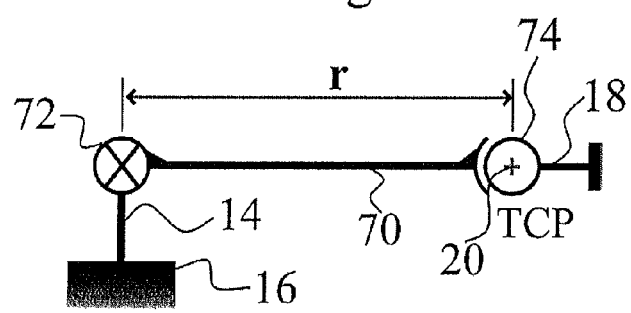

FIG. 31 shows a spherical joint 60 providing three rotational DOF to a TCP 20. As alternative to FIG. 31, FIG. 32 shows a structure having three distinct pivot joints 62, 64 and 66 arranged in series. This arrangement also provides three rotational DOF for TCP 20. FIG. 33 shows, as alternative to FIG. 31 and FIG. 32, an arrangement having the pivot joints 62 and 66 of FIG. 32 and, replacing joint 64 of FIG. 32, a possible embodiment of an RRC pivot joint 68. RRC pivot joint 68 reduces the volume occupied by the chain arrangement and improves accessibility to TCP 20, particularly along the x axis. FIG. 34 illustrates an arrangement having a rigid link 70. Rigid link 70 is terminated, at one of its ends, by a joint 72 providing two rotational DOF, and, at its other end, by a joint 74 providing three rotational DOF. The rotation center of joint 74 corresponds with TCP 20. Such an arrangement may be commonly found in known robotic structures and has three rotational DOF at TCP 20 and two translational DOF on a spherical surface with a radius r.

Figure 3:
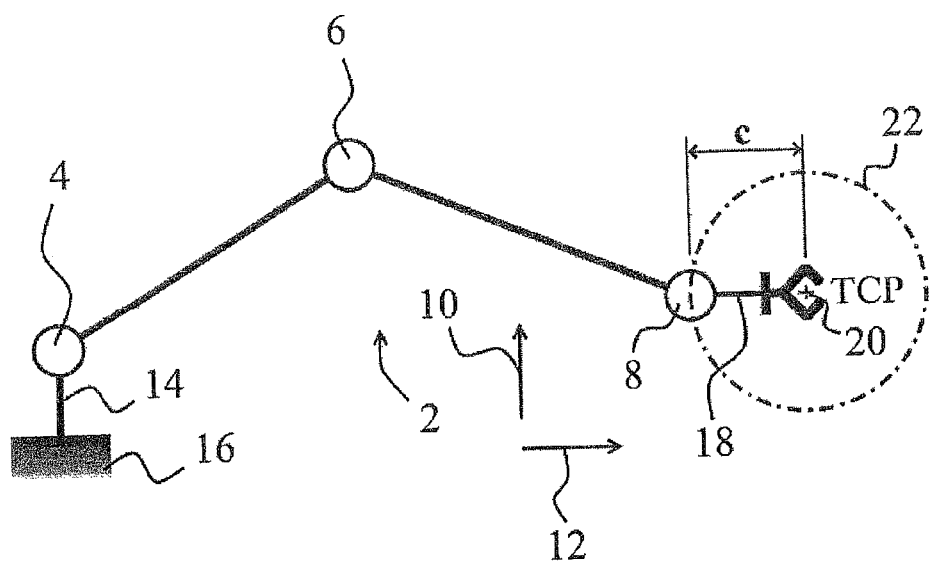
Figure 4:
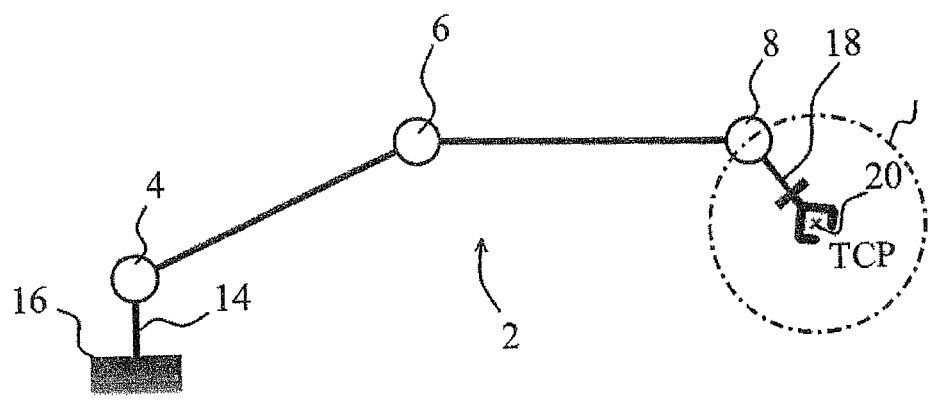
Figure 5:
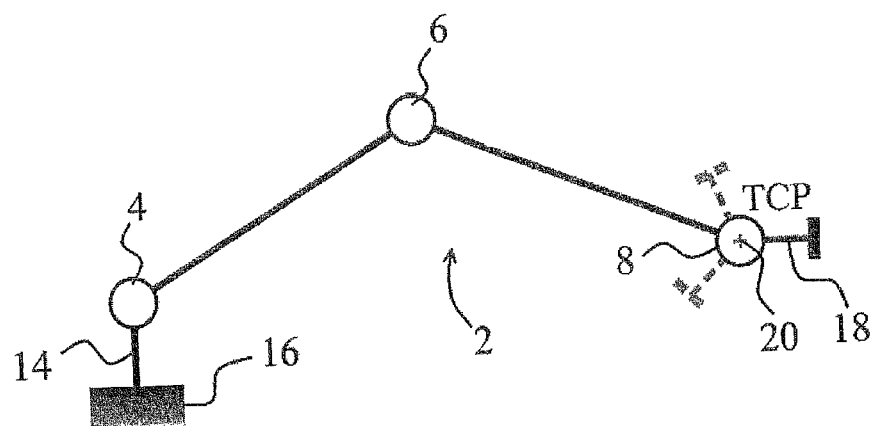
Figure 6:
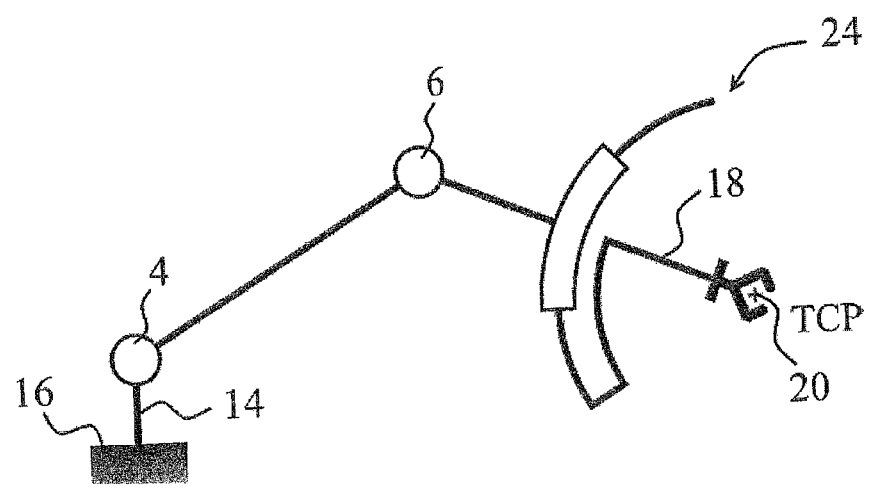
Figure 7:
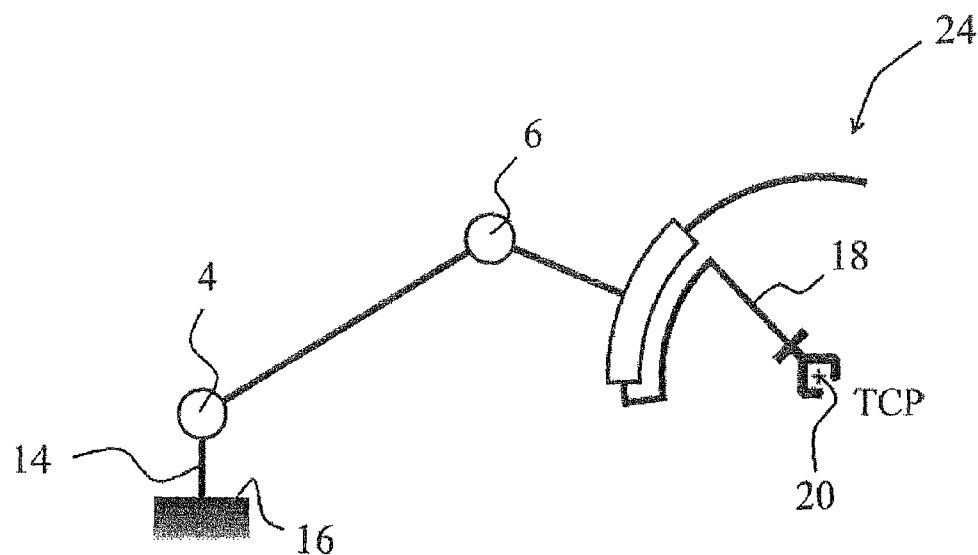
Figure 8:
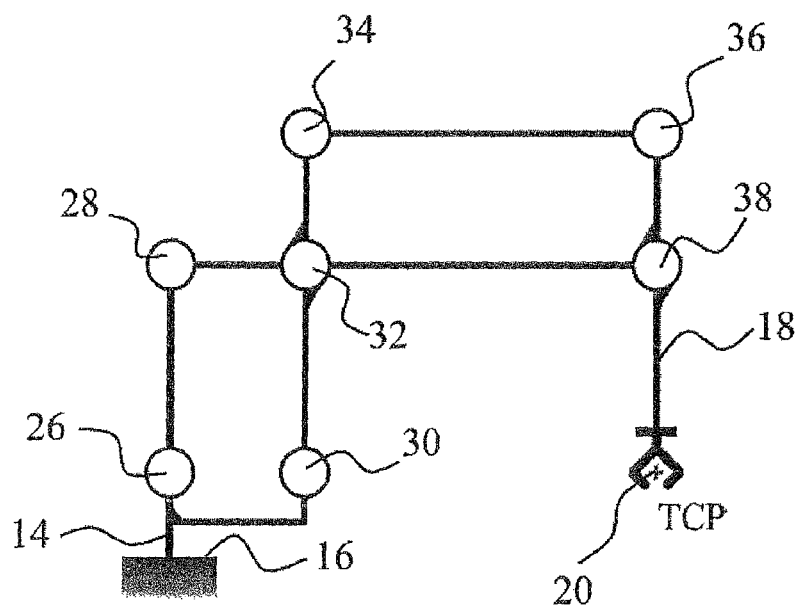
Figure 9:
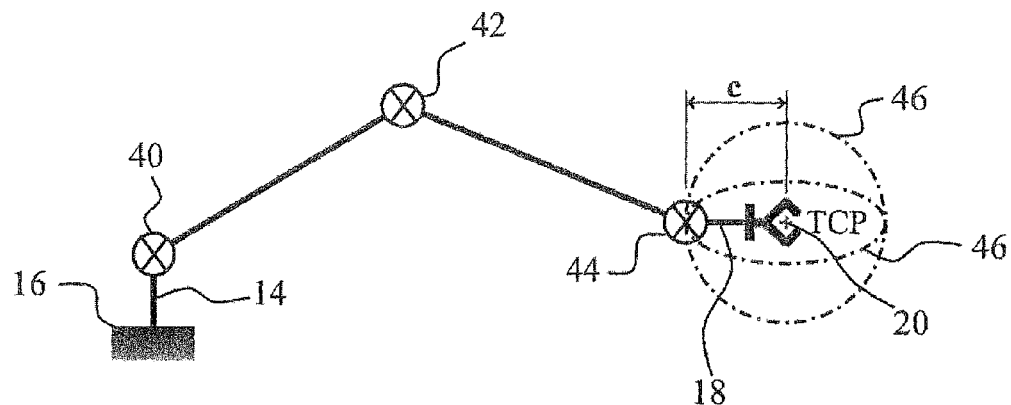
Figure 10:
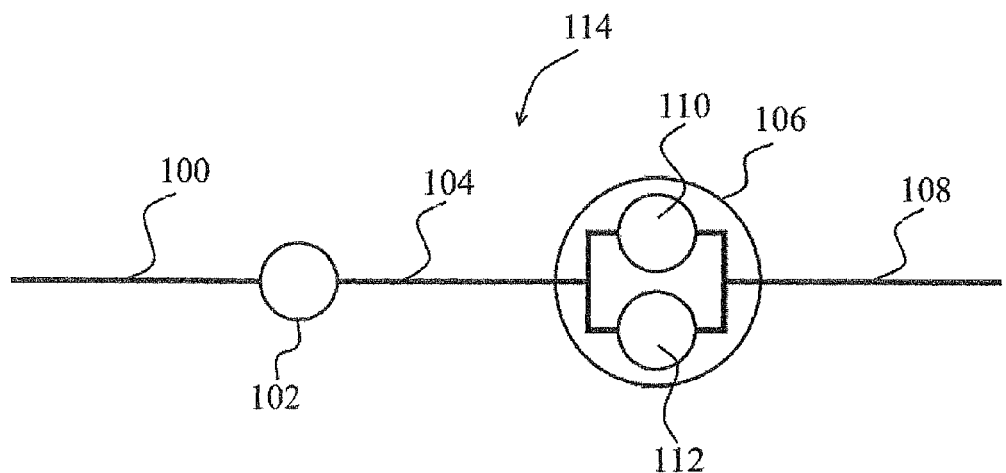
Figure 11:
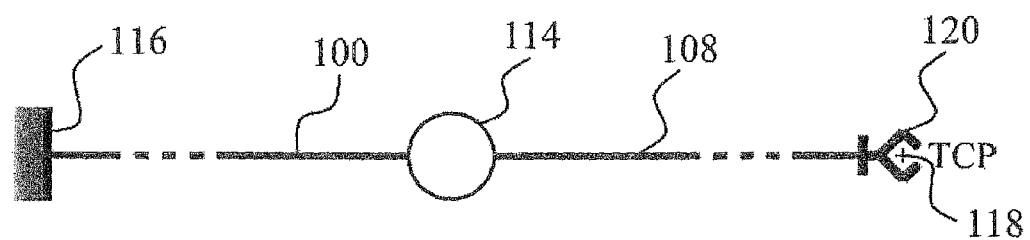
Figure 12:
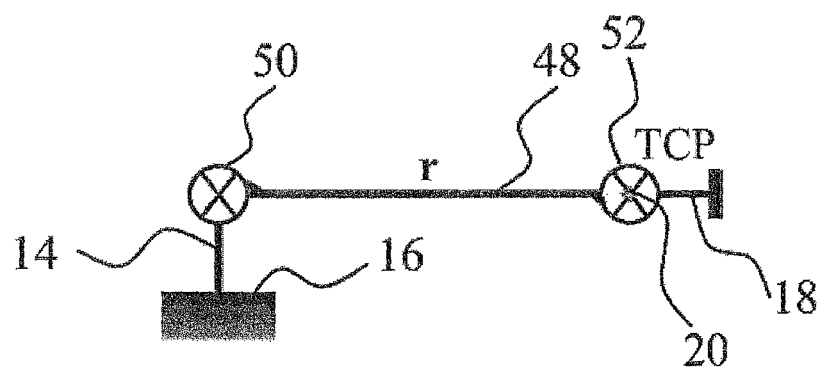
Figure 35:
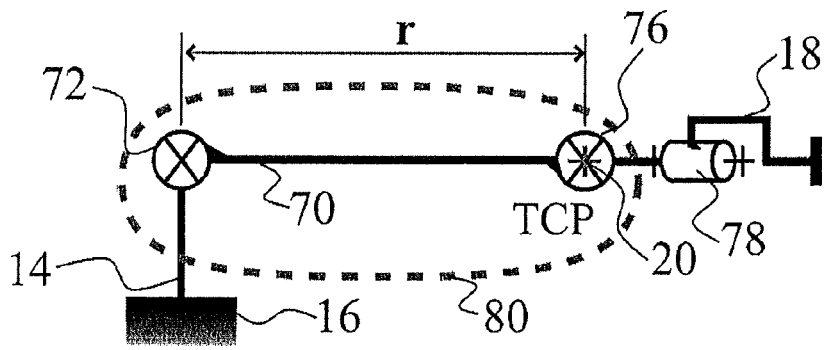

FIG. 35 shows, as alternative to the arrangement of FIG. 34, an arrangement wherein the above spherical joint 74 is replaced by an arrangement of a cardan joint or universal joint 76 and a pivot joint 78. The structure of FIG. 35 comprises, as sub-structure, the arrangement of FIG. 12; this is indicated by reference numeral 80. As described above, sub-structure 80 may be replaced by the present invention, as for example in its embodiment of FIG. 14. Such a replacement resulting in a further embodiment of the present invention is shown in FIG. 36.

Figure 36:
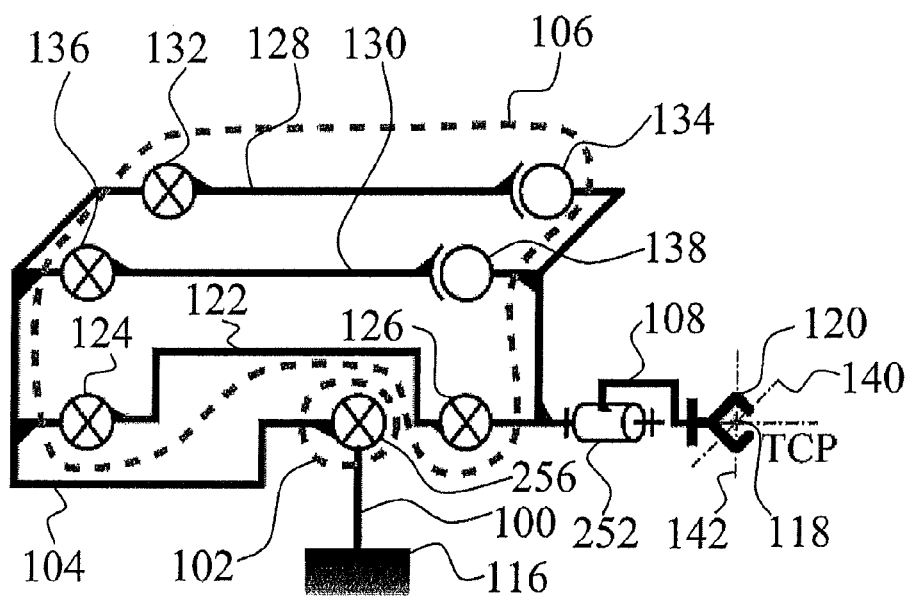

The embodiment of FIG. 36 comprises an input member 100, a first kinematics bond 102, an intermediate member 104, a second kinematics bond 106, an output member 108 and an end effector 120 having a TCP 118. In particular, the embodiment of FIG. 36 comprises, for replacing sub-structure 80 of FIG. 35, the embodiment of FIG. 14 apart from its output member and end effector. According to FIG. 36, output member 108 is coupled with second kinematics bond 106 via a joint 252. The function of joint 252 may be compared with the function of joint 78 of FIG. 35.

Figure 37:
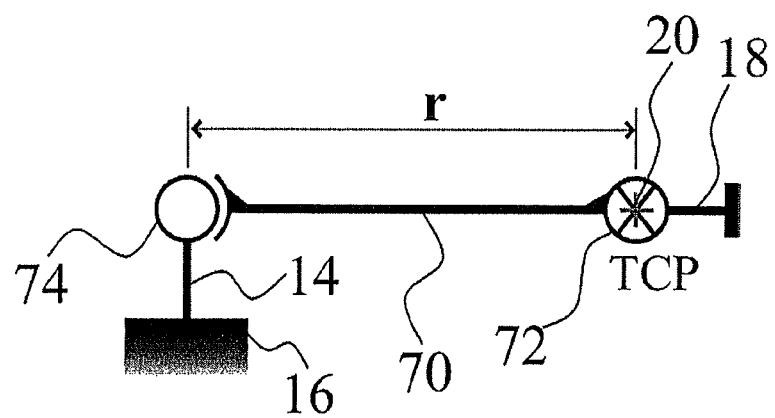
Figure 38:
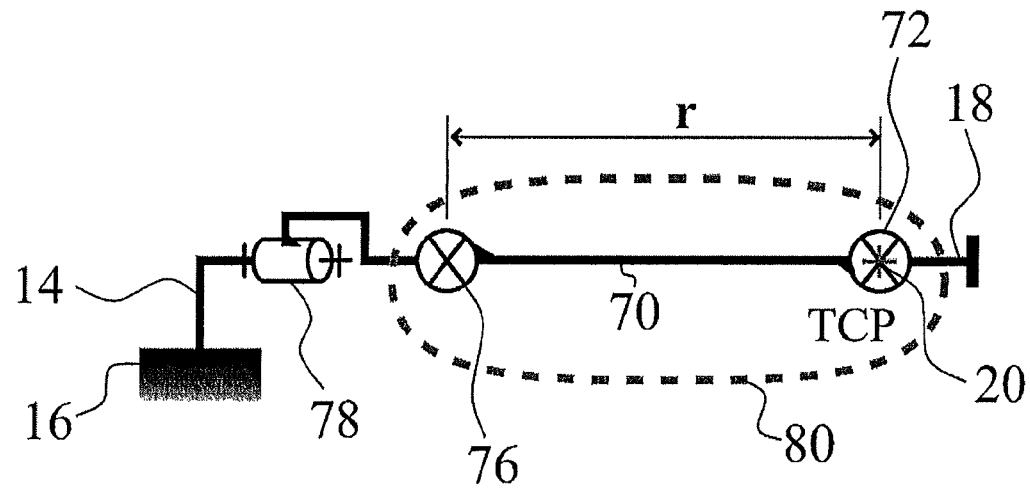

For describing further embodiments of the present invention now it is referred to FIGS. 37 and 38 showing known arrangements.

FIG. 37 shows, as alternative to arrangements of FIGS. 34 and 35, an arrangement having a rigid link 70. Rigid link 70 is terminated, at one of its ends, by a joint 74 providing three rotational DOF, and, at its other end, by a joint 72 providing two rotational DOF. The rotation center of joint 72 corresponds with TCP 20. Such an arrangement may be commonly found in known robotic structures and has three rotational DOF at TCP 20 and two translational DOF on a spherical surface with a radius r.

FIG. 38 shows, as alternative to the arrangement of FIG. 37, an arrangement wherein the above spherical joint 74 is replaced by an arrangement of a cardan joint or universal joint 76 and a pivot joint 78. The structure of FIG. 38 comprises, as sub-structure, the arrangement of FIG. 12; this is indicated by reference numeral 80. As described above, sub-structure 80 may be replaced by the present invention, as for example in its embodiment of FIG. 14. Such a replacement resulting in a further embodiment of the present invention is shown in FIG. 39.

Figure 39:
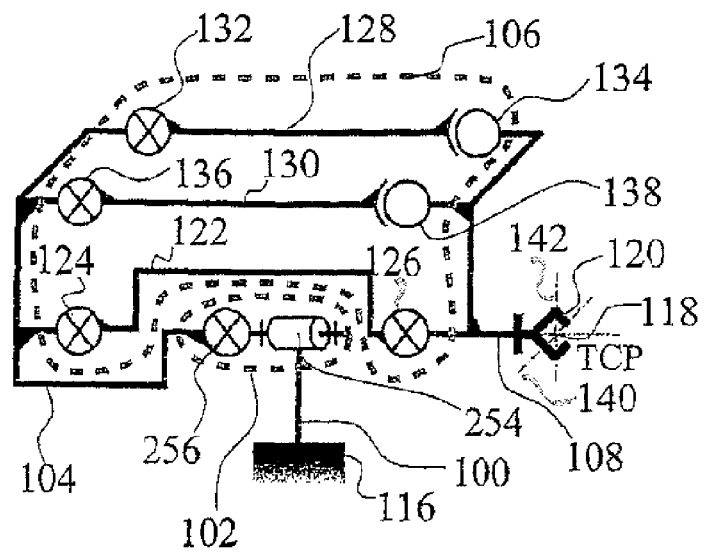

FIG. 39 shows an embodiment comparable with the embodiment of FIG. 14, apart from first kinematics bond 102. In embodiment of FIG. 14, kinematics bond 102 comprises a joint providing at least two rotational DOF in form of a universal joint or cardan joint 256. Here, first kinematics bond 102 comprises an additional pivot joint 254 directly coupled to input member 100 and provides three DOF. The function of joint 254 may be compared with the function of joint 78 of FIG. 38.

Figure 40:
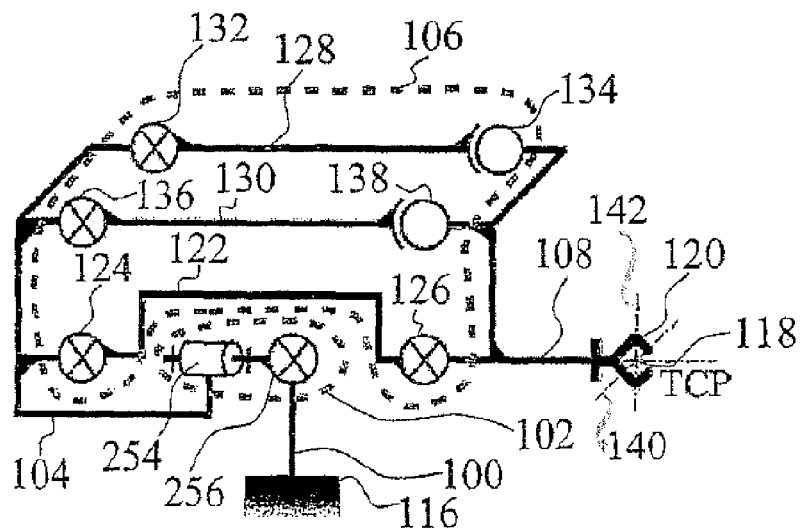

FIG. 40 shows, as alternative to the embodiment of FIG. 39, an embodiment wherein first kinematics bond 102 comprises a universal or cardan joint 256 and a pivot joint 254 in a different order, the universal or cardan joint being directly coupled to input member 100.

Figure 41:
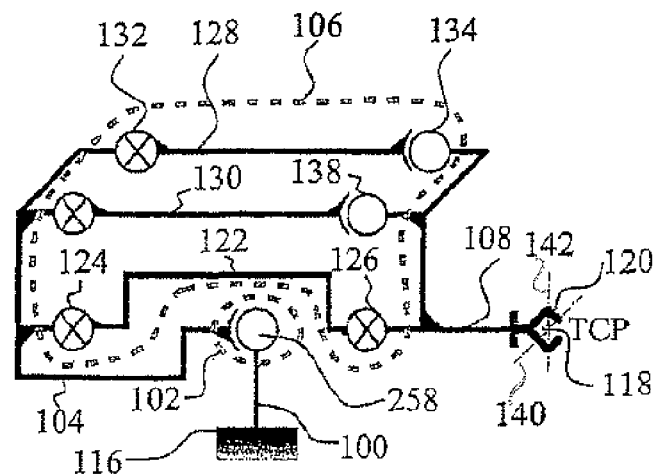

FIG. 41 shows, as alternative to the embodiments of FIGS. 39 and 40, an embodiment wherein kinematics bond 102 comprises a spherical joint 258 replacing the universal or cardan joint 256 and the pivot joint 254 of embodiments of FIGS. 39 and 40.

Figure 42:
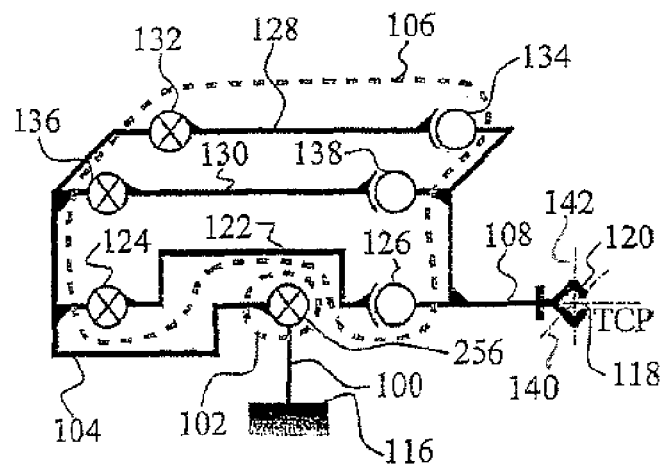

In the embodiment of FIG. 42, the function of pivot joint 254 of FIGS. 39 and 40 is integrally provided by second kinematics bond 106. Here, such function is achieved by jointed links 122, 128 and 130 each having the ability to twist along their respective longitudinal axis. The embodiment illustrated in FIG. 42 can be compared to embodiment of FIG. 14, a part from joint 126 in means 110 for providing motion on a curved surface of second kinematics bond 106. Here, joint 126 has three DOF, shown in FIG. 42 as an example in form of a spherical joint.

Before referring further to embodiments of the present invention, reference is made to known arrangements shown in FIGS. 43 to 46.

Figure 43:
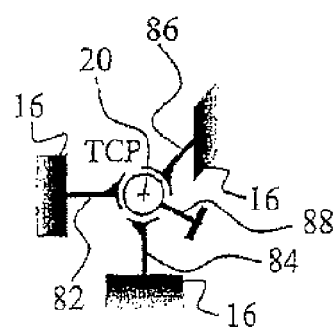

FIG. 43 illustrates a structure having an arrangement of three kinematics chains 82, 84, 86 arranged in parallel. This arrangement may be considered to replace the spherical joint of FIG. 31. Each one of the kinematics chains 82, 84 and 86 is made of one spherical joint 88 and forms a known structure referred to as spherical parallel structure. It is over constrained, since the centers of the three spherical joints 88 need to be coincident to enable rotational movements of the TCP 20, and therefore needs tight manufacturing tolerances.

Figure 44:
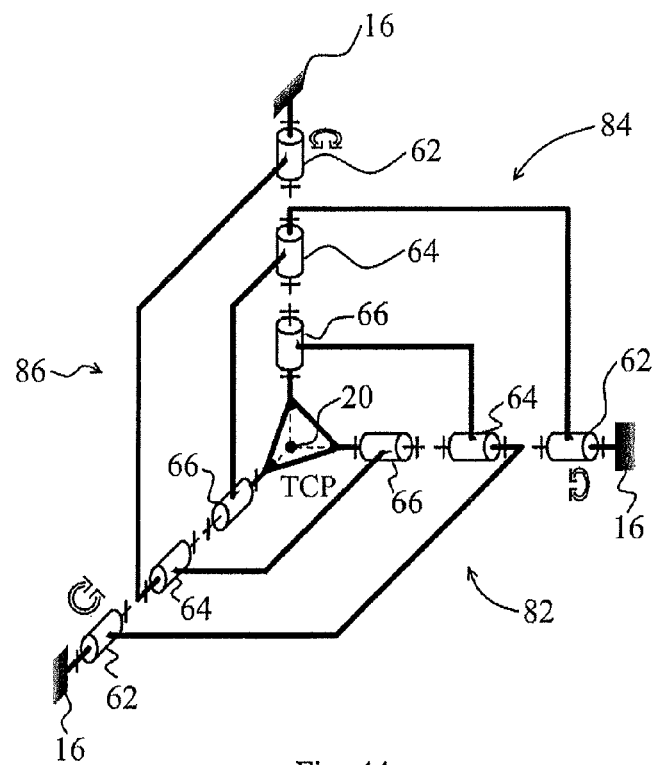

FIG. 44 shows a modification of the arrangement of FIG. 43 in that each one of the above three spherical joints 88 is replaced by the structure of FIG. 32. This represents a further known over-constrained kinematics structure having low rotational motion ranges due to interference between the kinematics chains and poor accessibility of the TCP 20. The first pivot joint 62 of each one of the three kinematics chains 82, 84 and 86 arranged in parallel is coupled to ground 16 and therefore well suited for actuation, as indicated by the curved arrow symbol on FIG. 44. This ensures lower inertia and lower weight of the moving parts of the structure compared with serial kinematics structure of FIG. 32 having its three pivot joints actuated.

Figure 45:
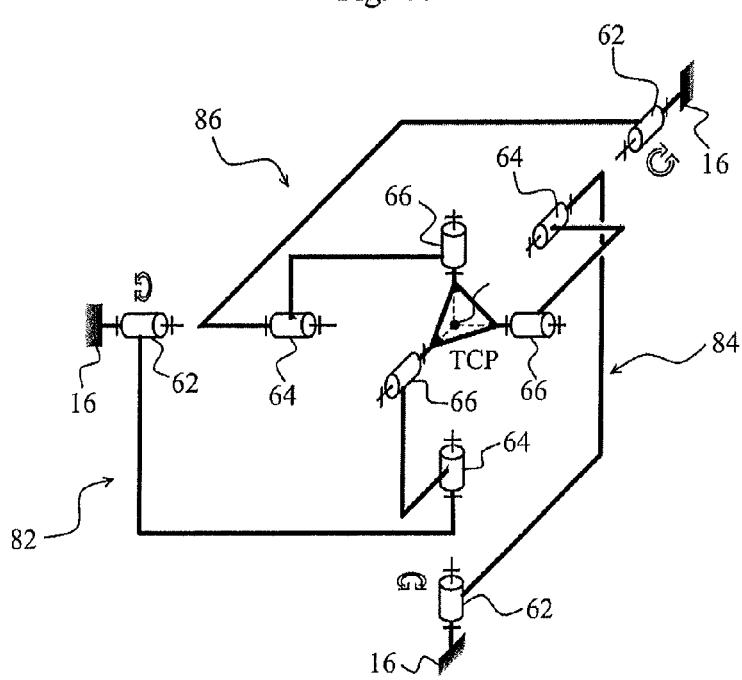

FIG. 45 shows an arrangement comparable to the structure of FIG. 44 apart from the modification that the terminal pivot joint of each kinematics chain is shifted along its respective rotation axis beyond TCP 20. This reduces mechanical interference limitations, however, completely "traps" TCP 20 "inside" the volume occupied by mechanical parts of the parallel kinematics structure.

Figures 46, 47:
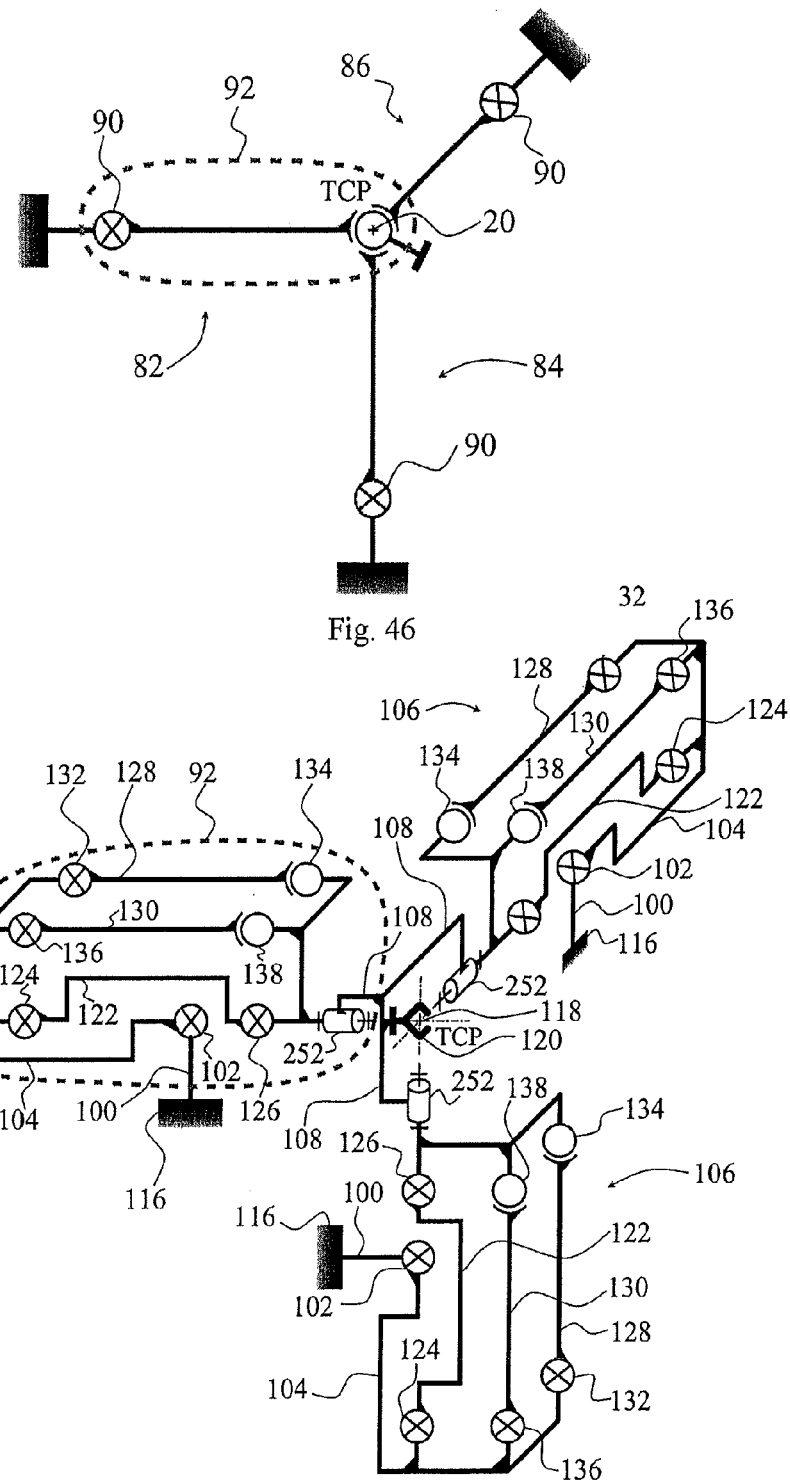

FIG. 46 shows an arrangement being a modification of the structure of FIG. 43. Here, at the beginning of each kinematics chain 82, 84 and 86, a universal joint or cardan joint 90 is inserted. This modification eliminates the spatial over-constraints of the arrangement of FIG. 43. As illustrated, each kinematics chain 82, 84 and 86 comprises, as sub-structure 92, the arrangement of FIG. 34, which in turn can be replaced by embodiments of the present invention, as for example in its embodiments of FIGS. 36, 39, 40, 41 and 42.

FIG. 47 shows the replacement of each one of the three sub-structures 92 of FIG. 46 by embodiment of FIG. 36. It is to be noted that the embodiments replacing the sub-structures need not be identical for each one of the three kinematics chains 82, 84 and 86.

Figure 48:
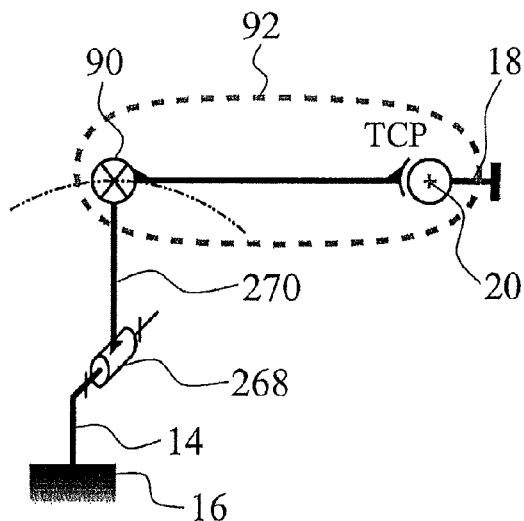

For describing a further embodiment of the present invention now it is referred to FIG. 48 showing a known arrangement, commonly found in robotics structures.

FIG. 48 shows an arrangement being a modification of the structure of FIG. 34. Here, an additional pivot joint 268 is inserted at the beginning of the kinematics chain, directly coupled to input member 14. This pivot joint 268 coupled to a link 270 provides one translational DOF on a circular path, as illustrated on FIG. 48. Hence, the structure provides six DOF to the output member at its TCP 20. As illustrated, the arrangement comprises, as sub-structure 92, the arrangement of FIG. 34, which in turn can be replaced by the present invention, as for example in its embodiments of FIG. 36, 39, 40, 41 or 42. Such a replacement resulting in a further embodiment of the present invention is shown in FIG. 49.

Figure 49:
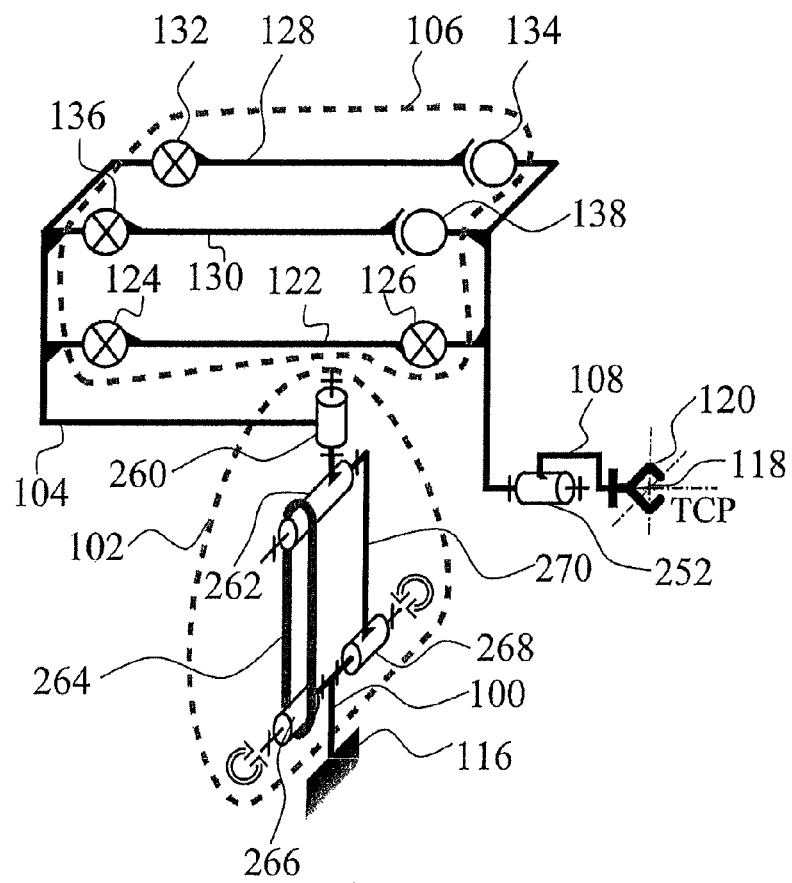

FIG. 49 illustrates an embodiment of the present invention comparable with the embodiment of FIG. 36, apart from the first kinematics bond 102. Here, first kinematics bond 102 comprises two pivot joints 260 and 262 providing two rotational DOF and pivot joint 268 coupled to a link 270 providing one translational DOF on a curved path, wherein pivot joint 268 is coupled to ground 116 via input member 100. Pivot joint 262 is coupled with a timing belt or cable 264. Timing belt 264 is coupled with a joint 266, which in turn is coupled to ground 116 via input member 100.

Joints 266 and 268 may be actuated pivot joints, wherein joint 266 controls one rotational DOF through timing belt 264 and joint 268 controls one translational DOF of TCP 118. This embodiment reduces inertia of moving parts because the heavy static parts of actuators in joints 266 and 268 and power supply may be rigidly coupled to ground and, thus, are not to be moved for moving TCP 118.

Figure 50:
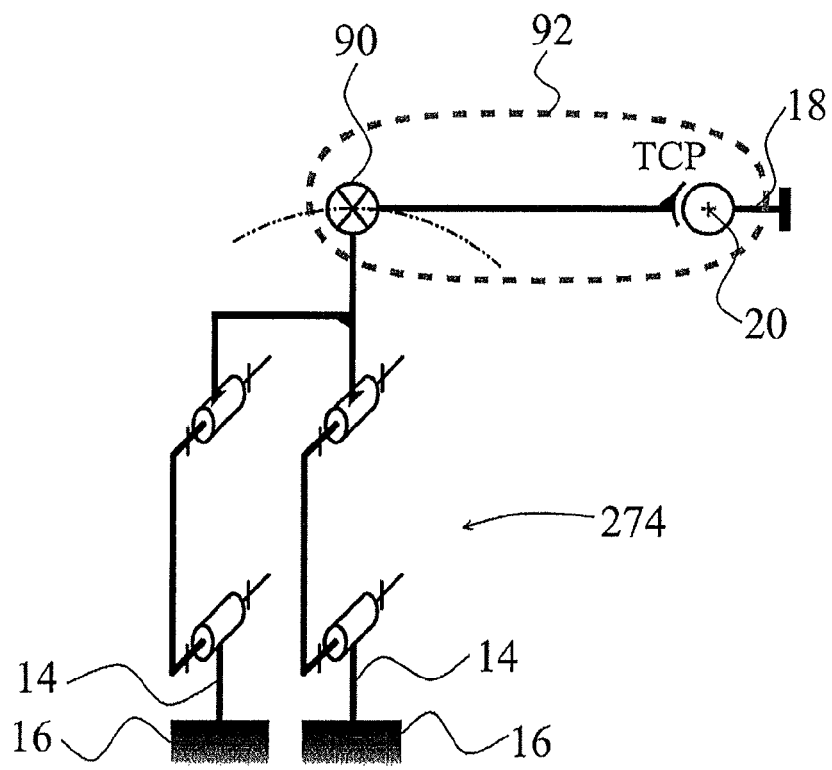
Figure 51:
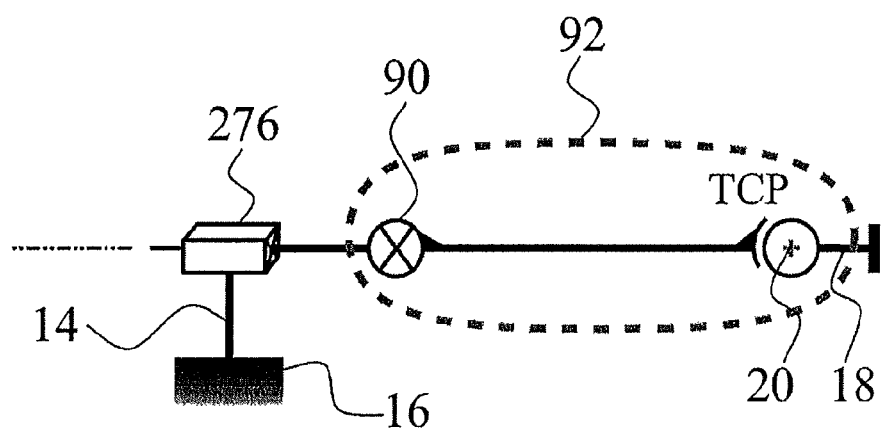

For describing further embodiments of the present invention now it is referred to FIGS. 50 and 51 showing known arrangements, commonly found in robotic structures.

FIG. 50 shows an arrangement being a modification of arrangement of FIG. 48, wherein pivot joint 268 is replaced by a planar parallelogram structure 274. Here, parallelogram 274 provides one translational DOF on a curved path and has the same function as the pivot joint 268 in the arrangement of FIG. 48.

FIG. 51 shows an arrangement being a modification of arrangement of FIG. 50, wherein the planar parallelogram structure 274 is replaced by a prismatic joint or linear joint 276. Here, joint 276 provides one translational DOF on a rectilinear path, without the deviation on a curved path occurring in parallelogram 274 in the arrangement of FIG. 50. As illustrated in FIG. 51, the arrangement comprises, as sub-structure 92, the arrangement of FIG. 34, which in turn can be replaced by the present invention, as for example in its embodiments of FIG. 36, 39, 40, 41 or 42. Such a replacement resulting in a further embodiment of the present invention is shown in FIG. 52.

Figure 52:
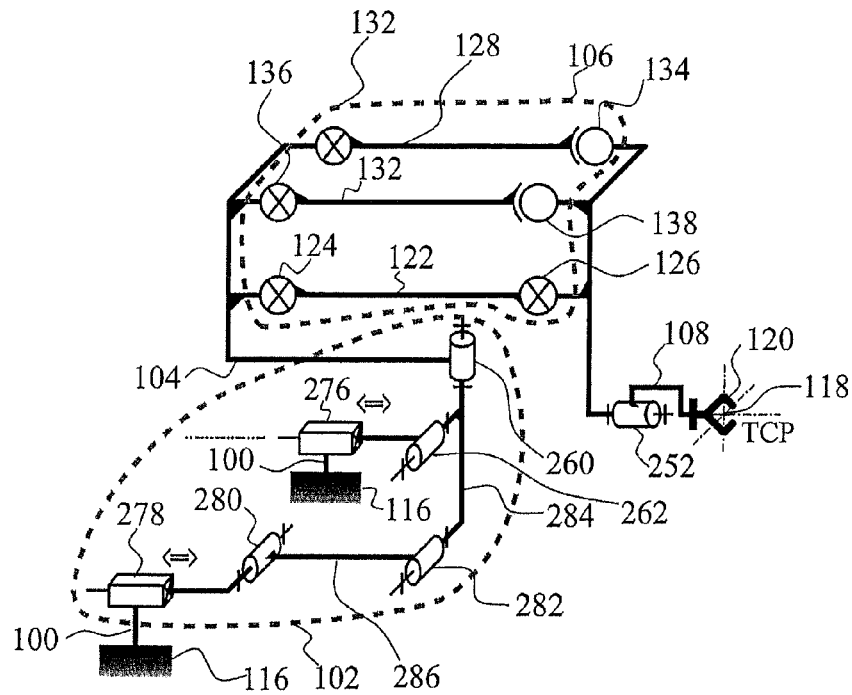

FIG. 52 illustrates an embodiment of the present invention comparable with the embodiment of FIG. 36, apart from the first kinematics bond 102. Here, first kinematics bond 102 comprises two pivot joints 260 and 262 providing two rotational DOF and a prismatic joint 276 providing one translational DOF on a rectilinear path. Furthermore, first kinematics bond 102 comprises a prismatic joint 278 coupled to pivot joint 262 through jointed link 286 connected to link 284. Jointed link 286 comprises a link 286, which is coupled at its ends with a joint 280 and a joint 282, each of which provides at least one rotational DOF. Prismatic joints 276 and 278 are coupled to ground.

Joints 276 and 278 may be actuated prismatic joints, wherein joint 278 controls one rotational DOF through jointed link 286 and joint 276 controls one translational DOF of TCP 118. This embodiment reduces inertia of moving parts because the heavy static parts of actuators in joints 276 and 278 and power supply may be rigidly coupled to ground and, thus, are not to be moved for moving TCP 118. In this embodiment, the angular motion range of the controlled rotational DOF is limited because of the singular postures occurring when links 286 and 284 are aligned to each other. Furthermore, the relationship between translational movement of prismatic joint 278 and angular movement transmitted to joint 262 by the jointed link 286 is not constant throughout the motion range.

Figure 53:
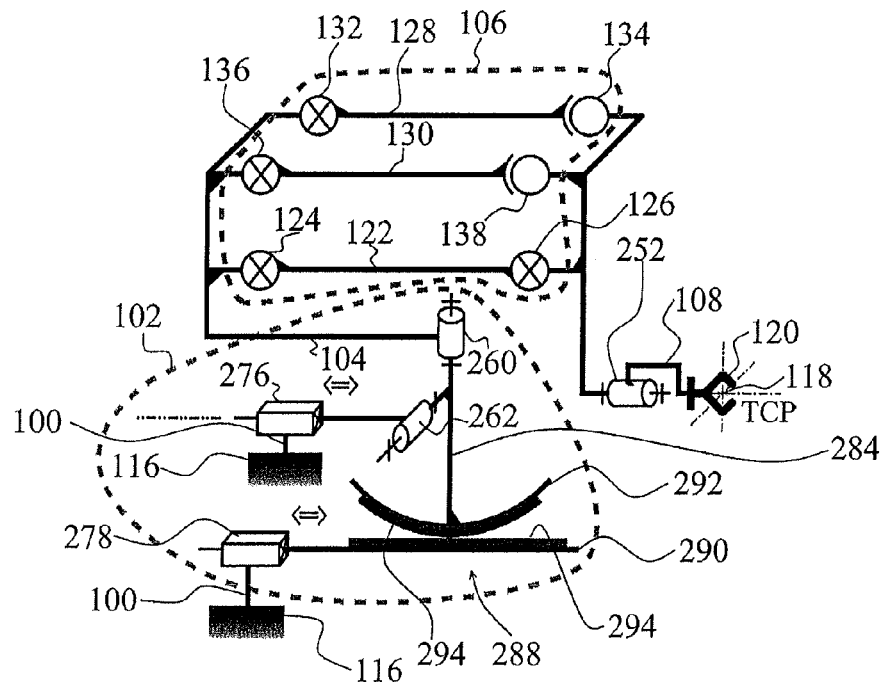

FIG. 53 shows a further embodiment being a modification of the embodiment of FIG. 52. Here, jointed link 286 is replaced by transmission means 288, comprising a straight portion 290 coupled to prismatic joint 278 and a curved portion 292 coupled to link 284. The two portions 290 and 292 are coupled through engagement means 294, as for example in form of a toothed gear profile, contact friction or at least one cable, wire, string, tendon, belt or band.

Figure 54:
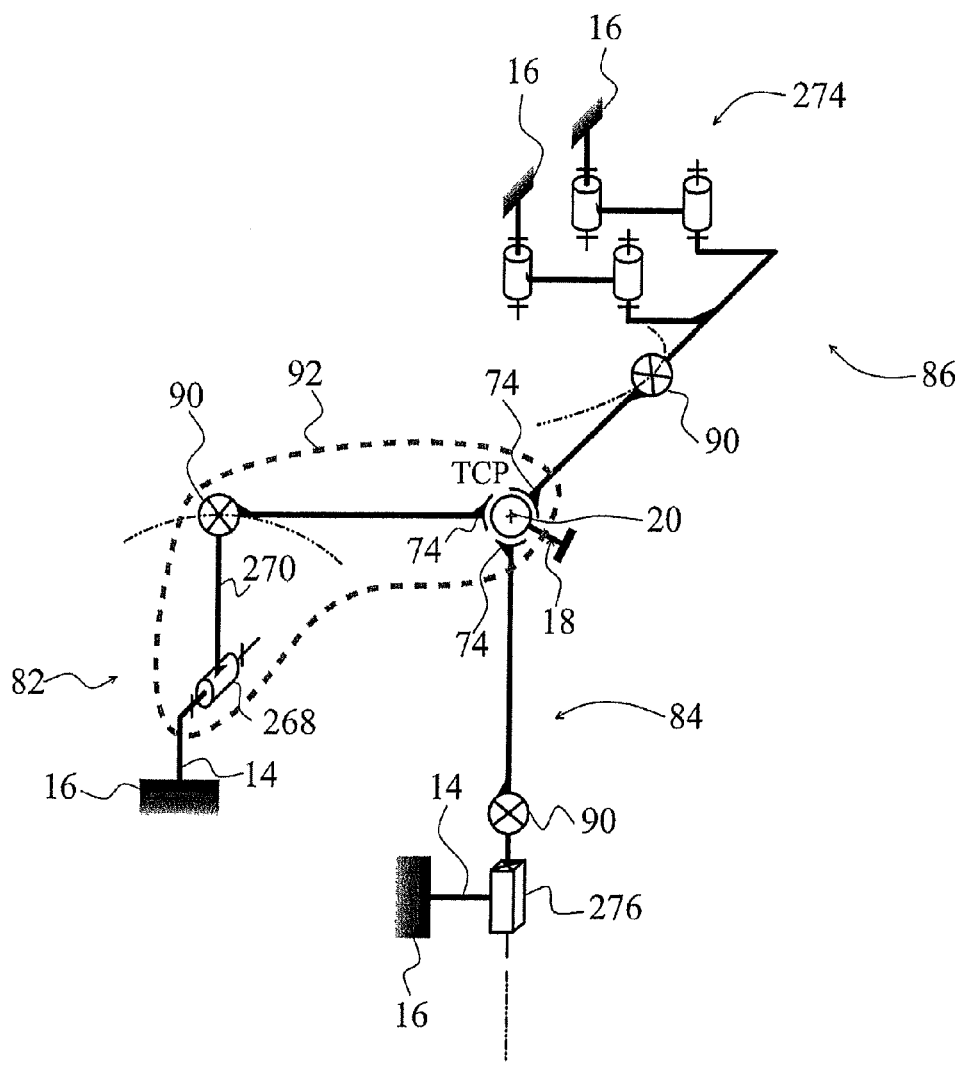

FIG. 54 shows a kinematics structure with six DOF, based on a parallel arrangement of three kinematics chains 82, 84 and 86, corresponding to the structures illustrated in FIGS. 48, 51 and 50 respectively. For the sake of comprehensiveness, the three chains are represented in a nominal posture, each one extending in a direction orthogonal to the directions of other two chains. It is to be noted that the chains may be freely chosen, as for example but not limited to the structures illustrated in FIGS. 48, 51 and 50. In particular, identical chains or a different number of chains than three may be chosen to form a six DOF parallel kinematics structure. Inaccessibility of TCP 118 and inherent angular limitations of the three spherical joints 74 with coincident rotation centers are evident drawbacks of this structure. As discussed above, arrangements of FIGS. 48, 51 can be replaced by the present invention, as for example in its embodiments of FIGS. 49 and 52. Such a replacement is shown in FIG. 55.

Figure 55:
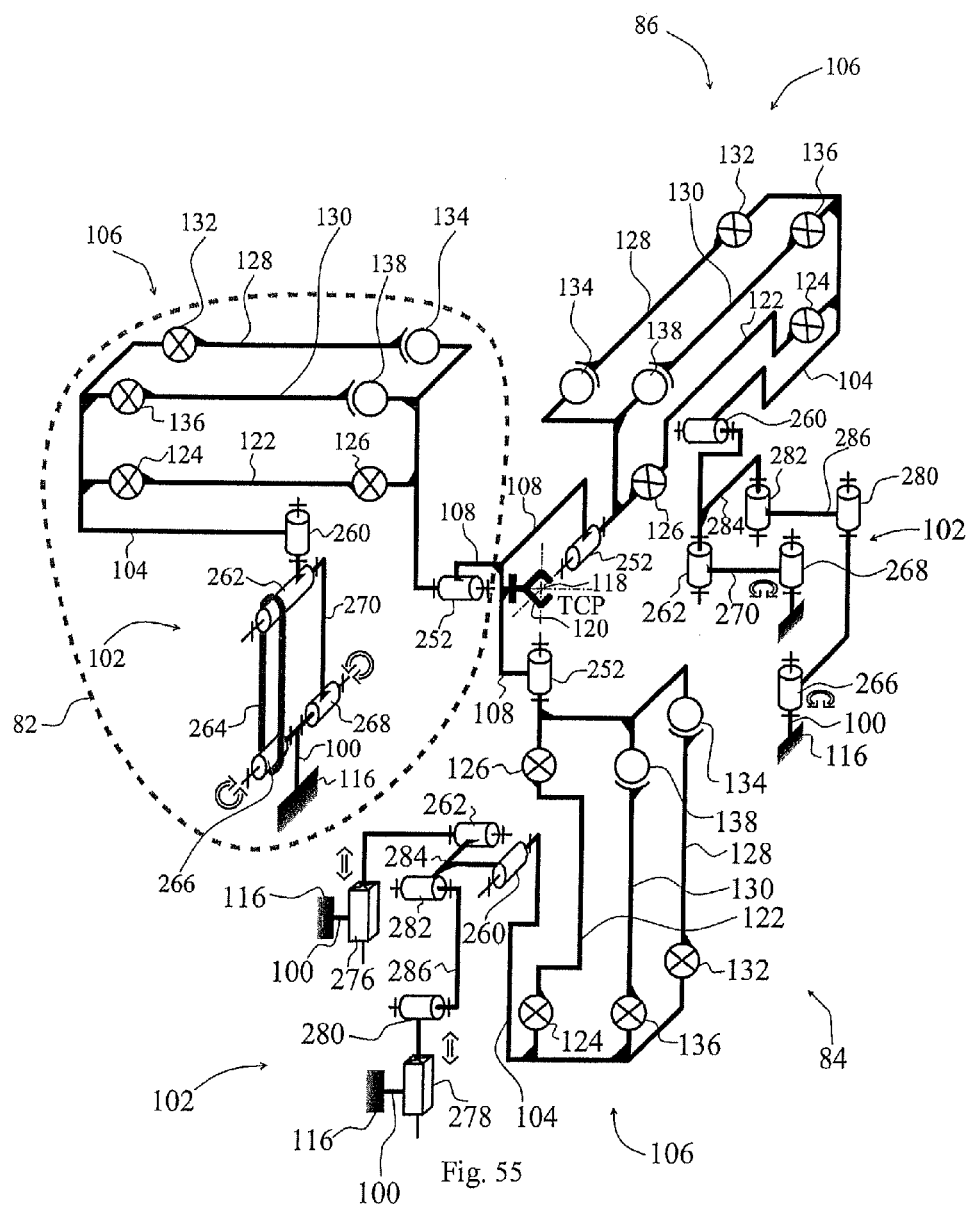

FIG. 55 shows a kinematics structure with six DOF, based on a parallel arrangement of three kinematics chains 82, 84 and 86, each one comprising an embodiment of the present invention. Kinematics chains 82 and 84 correspond to the structures illustrated in FIGS. 49 and 52 respectively. Kinematics chain 86 is an arrangement comparable to embodiment of FIG. 49, apart from timing belt 264. Here, timing belt 264 is replaced by jointed link 286, providing increased stiffness but reduced angular motion range, since links 270 and 286 form a parallelogram, which has singular postures occurring when these two links are aligned.

As illustrated by arrows in FIG. 55, six joints may be actuated. These actuated joints are all directly coupled to ground 116, with the benefits discussed in relation with FIGS. 49 and 52.

The invention claimed is:

1. A device for the relative movement between an input member and an output member, the device comprising:
   an input member;
   an output member;
   an intermediate member coupling the input member and the output member;
   a first kinematics bond coupling the intermediate member and the input member; the first kinematics bond providing at least two rotational degrees of freedom to the intermediate member with respect to the input member;
   a second kinematics bond only coupling the intermediate member and the output member;
   wherein the second kinematics bond comprises
   constraining means constraining at least two rotational degrees of freedom between the intermediate member and the output member; and
   motion providing means providing motion on a curved surface for movements of the output member in relation to the intermediate member when the constraining means constrains said at least two rotational degrees of freedom between the intermediate member and the output member wherein the constraining means also provides, at substantially the same time, at least two translational degrees of freedom to the output member for movements on said curved surface;
   wherein the second kinematics bond transmits rotational motions from the intermediate member to the output member and offsets rotation axes of said at least two rotational degrees of freedom of the intermediate member to a remote location on the output member when the constraining means constrains said at least two rotational degrees of freedom between the intermediate member and the output member while allowing, at the same time, motion of the output member on said curved surface in relation to the intermediate member,
   such that the output member is capable, in relation to the input member, of motion on said curved surface in translational degrees of freedom as well as motion in the at least two rotational degrees of freedom that are provided by the first kinematics bond to the intermediate member in relation to the input member.

2. The device of claim 1, wherein the first kinematics bond comprises at least one of the following:
   a jointed link;
   a jointed parallelogram;
   a pivot joint;
   a pivot joint with remote rotation axis;
   a universal joint;
   a cardan joint;
   a spherical joint;
   a timing belt;
   a cable;
   a wire;
   a string;
   a tendon;
   a band;
   gears;
   a deformable solid state hinge;
   a deformable beam;
   a deformable bar;
   a deformable membrane;
   an elastic constraining element;
   a ball bearing;
   a friction bearing;
   surface portions in contact.

3. The device of claim 1, wherein the output member comprises at least two rotational degrees of freedom having rotation axes, each of which being spatially offset with respect to corresponding rotation axis associated to the rotational degrees of freedom of the intermediate member provided to it by the first kinematics bond.

4. The device of claim 3, wherein said at least two rotational degrees of freedom of said output member have rotation axes, which are intersecting in a common remote rotation center.

5. The device of claim 1, wherein the motion providing means comprises at least one of the following:
   a jointed link;
   a jointed parallelogram;
   a pivot joint;
   a pivot joint with remote rotation axis;
   a universal joint;
   a cardan joint;
   a spherical joint;
   a timing belt;
   a cable;
   a wire;
   a string;
   a tendon;
   a band;
   gears;
   a deformable solid state hinge;
   a deformable beam;
   a deformable bar;
   a deformable membrane;
   an elastic constraining element;
   a ball bearing;
   a friction bearing;
   surface portions in contact.

6. The device of claim 1, wherein the motion providing means comprises a link connected to the intermediate member on a first end having at least two rotational degrees of freedom, and to the output member on a second end having at least two rotational degrees of freedom.

7. The device of claim 1, wherein the motion providing means comprises a link connected to the intermediate member on a first end having at least two rotational degrees of freedom, and to the output member on a second end having at least two rotational degrees of freedom, the two rotational degrees of freedom of the second end having parallel rotation axes and reversed order with respect to the two rotational degrees of freedom of the first end.

8. The device of claim 1, wherein said motion providing means being adapted to provide motion on a particular curved surface being a portion of a sphere for simultaneously offsetting by a same distance at least two rotation axes associated to said rotational degrees of freedom provided to the intermediate member by the first kinematics bond.

9. The device of claim 1, wherein the constraining means comprises at least one of the following:
   a jointed link;
   a jointed parallelogram;
   a pivot joint;

a pivot joint with remote rotation axis;
a universal joint;
a cardan joint;
a spherical joint;
a timing belt;
a cable;
a wire;
a string;
a tendon;
a band;
gears;
a deformable solid state hinge;
a deformable beam;
a deformable bar;
a deformable membrane;
an elastic constraining element;
a ball bearing;
a friction bearing;
surface portions in contact.

10. The device of claim 1, wherein the constraining means comprises a link connected to the intermediate member on a first end having at least two rotational degrees of freedom, and to the output member on a second end, having at least two rotational degrees of freedom.

11. The device of claim 1, wherein the constraining means and the motion providing means is a single means being adapted to jointly provide motion on the curved surface and to constrain said at least two rotational degrees of freedom.

12. The device of claim 1, further comprising means being adapted to constrain at least one translational degrees of freedom of the device.

13. The device of claim 12, wherein the means being adapted to constrain at least one translational degrees of freedom of the device comprises at least one of the following:
    a jointed link;
    a jointed parallelogram;
    a pivot joint;
    a pivot joint with remote rotation axis;
    an universal joint;
    a cardan joint;
    a spherical joint;
    a timing belt;
    a cable;
    a wire;
    a string;
    a tendon;
    a band;
    gears;
    a deformable solid state hinge;
    a deformable beam;
    a deformable bar;
    a deformable membrane;
    an elastic constraining element;
    a ball bearing;
    a friction bearing;
    surface portions in contact.

14. The device of claim 12, wherein the means being adapted to constrain at least one translational degree of freedom of the device comprises means to constrain at least one rotational degrees of freedom of said means of the second kinematics bond being adapted to provide motion on a curved surface or of said means of the second kinematics bond being adapted to constrain at least two rotational degrees of freedom.

15. The device of claim 1, being adapted for actuation of at least one of its degrees of freedom.

16. The device of claim 15, wherein adaptation for actuation of at least one of its degrees of freedom comprises at least one of the following:
    a rotative actuator;
    a linear actuator;
    an electrical DC motor;
    an electrical brushless motor;
    a piezo-electrical actuator;
    a stick and slip actuator;
    an inertial drive actuator;
    an impact drive actuator;
    an ultra-sound actuator;
    a voice-coil actuator;
    a moving magnet actuator;
    a hydraulic actuator;
    a pneumatic actuator;
    a direct drive actuator;
    a transmission stage;
    gears;
    a timing belt;
    a cable;
    a band;
    a screw drive;
    an elastic constraining element.

17. The device of claim 1, being adapted to transmit actuated motion of at least one externally provided degree of freedom through at least one of its constrained degrees of freedom.

18. The device of claim 1, wherein the first kinematics bond and the input member are a part of a parallel or hybrid kinematics structure.

19. The device of claim 1, having at least one sensor coupled to at least one of its degrees of freedom.

20. The device of claim 19, wherein the at least one sensor coupled to at least one of its degrees of freedom comprises at least one of the following:
    a position sensor;
    a distance sensor;
    an orientation sensor;
    an angle sensor;
    an incremental sensor;
    an encoder;
    a tachymeter;
    an electrical sensor;
    an end-stop sensor;
    an absolute reference sensor;
    an initialization sensor;
    a calibration sensor;
    an optical sensor;
    an optical fiber;
    a laser beam;
    a laser interferometer;
    a magnetic sensor;
    a Hall effect sensor;
    a capacitive sensor;
    an accelerometer;
    a gyroscopic device;
    a deformation sensor;
    a displacement sensor;
    a strain gage;
    a force sensor;
    a torque sensor;
    a multiple degree of freedom sensor;
    an electrical signal amplifier;
    a filtering device;
    a signal conditioning device.

21. The device of claim 1, being coupled to a control unit.

22. The device of claim 1, wherein the input member is adapted to be coupled to ground or a mounting surface.

23. The device of claim 1, wherein the output member is adapted to be coupled to a terminal member for receiving at least one of the following devices:
- an instrument;
- a tool;
- a gripper;
- an antenna;
- a sensor;
- an endoscope;
- an optical guide;
- a camera;
- a laser;
- a X-ray gun;
- an ultra-sound probe.

24. An arrangement comprising:
- a parallel or hybrid kinematics structure providing at least six degrees of freedom; and
- the device of claim 1 being incorporated in said kinematics structure.

25. An arrangement comprising the device of claim 1, being incorporated in one of the following:
- a serial kinematics structure;
- a parallel kinematics structure;
- a hybrid kinematics structure;
- a robot or industrial robot;
- a manipulator;
- a passive constraining device or joint;
- a path generation device;
- a user input device;
- a medical device (e.g. for use in neurological, maxillofacial, dental, eye, cervical, orthopedic, vertebral, abdominal, thorax, basin, urological, gynecological, therapeutical, diagnostic, operative, surgical applications);
- a holding device (e.g. for an instrument, tool, gripper, antenna, sensor, endoscope, optical guide, camera, laser, X-ray gun, ultra-sound probe, biological tissue, human body part);
- a wrist structure;
- a machine tool (e.g. for machining, grinding, milling, drilling, polishing, gas torch cutting, laser cutting, water jet cutting);
- a mobile platform;
- a vehicle (e.g. submarine, in pipe, terrestrial, airborne, space);
- a micro-manipulator;
- a nano-manipulator;
- a tele-manipulator (as master input and/or slave device);
- a steering device;
- a pointing device
- a control console;
- a command center;
- a cockpit;
- a haptic device for providing active tactile and/or force feedback to a user;
- a passive and/or active back-drivable device;
- a non back-drivable device;
- a statically and/or dynamically balanced device;
- an actively and/or passively gravity compensated device;
- a calibrated device;
- a simulation, learning or training device;
- a gesture assessment and/or certification device;
- a compliant and/or shock-absorbing mechanism;
- a guiding device;
- a lockable device;
- an active guiding and/or selectively compliant device;
- an implantable device;
- an exoskeleton device;
- a minimal invasive surgery device;
- a micro-surgery device;
- a sterilizable device;
- a rehabilitation and/or exercising device;
- an orthosis device;
- a human assistive device;
- a home care device;
- a home appliance device;
- a housekeeping device;
- a kitchen device;
- a furniture mechanism (e.g. chair, drawer, folding table, bed, window);
- a heavy load mechanism (e.g. truck, civil engineering construction machine, crane);
- a vibrating device;
- a vibration damping and/or shock absorbing device;
- an inertial device;
- a measurement and/or sensing device;
- a positioning and/or alignment device;
- a contact following and/or force application device;
- a high precision device;
- a part handling or part transfer device;
- a painting and/or coating device;
- a dispensing and/or pipetting device (e.g. for adhesives or lubricants in liquid, gel, foam or cream state);
- a packaging device;
- a palletizing device;
- a piece goods handling device;
- a packaging device;
- a microelectronics industry device;
- a food industry device;
- an inspection and/or exploration device;
- a testing device;
- a quality control device;
- a shock, resistance and/or wear testing device;
- a data acquisition device;
- a monitoring device;
- a welding device;
- a soldering device;
- a brazing device;
- an assembly and/or manufacturing device;
- a gaming, entertainment and/or consumer grade device;
- a demonstration, exhibition and/or educational device;
- an artistic or aesthetical device;
- a compact, self-powered, portable, mobile and/or wearable device;
- an engine;
- an energy transformation device;
- a military device or weapon component.

* * * * *